United States Patent
Ellis et al.

(10) Patent No.: US 10,338,439 B2
(45) Date of Patent: Jul. 2, 2019

(54) TOUCH DETECTION USING COMMON ELECTRODES OF DISPLAY DEVICE

(71) Applicant: Parade Technologies, Ltd., Santa Clara, CA (US)

(72) Inventors: Denis Ellis, Cobh (IE); Maksym Prybytko, Douglas (IE); Tim McCarthy, Bandon (IE)

(73) Assignee: PARADE TECHNOLOGIES, LTD., San Jose, CA (US)

(*) Notice: Subject to any disclaimer, the term of this patent is extended or adjusted under 35 U.S.C. 154(b) by 40 days.

(21) Appl. No.: 15/466,760

(22) Filed: Mar. 22, 2017

(65) Prior Publication Data

US 2018/0275821 A1    Sep. 27, 2018

(51) Int. Cl.
| | |
|---|---|
| G06F 3/041 | (2006.01) |
| G02F 1/1343 | (2006.01) |
| G06F 3/044 | (2006.01) |
| G02F 1/1368 | (2006.01) |
| G02F 1/1333 | (2006.01) |

(52) U.S. Cl.
CPC ...... G02F 1/134309 (2013.01); G02F 1/1368 (2013.01); G02F 1/13338 (2013.01); G06F 3/044 (2013.01); G06F 3/0412 (2013.01); G06F 3/0416 (2013.01); G02F 2001/134318 (2013.01); G02F 2201/121 (2013.01)

(58) Field of Classification Search
CPC ....... G06F 3/0416; G06F 3/044; G06F 3/0488
See application file for complete search history.

(56) References Cited

U.S. PATENT DOCUMENTS

| | | | | |
|---|---|---|---|---|
| 2009/0115737 A1* | 5/2009 | Toyoshima | ............. | G06F 3/044 345/173 |
| 2013/0314343 A1* | 11/2013 | Cho | ....................... | G06F 3/0412 345/173 |
| 2013/0328799 A1* | 12/2013 | Bi | ........................... | G06F 3/041 345/173 |

* cited by examiner

*Primary Examiner* — Roy P Rabindranath
(74) *Attorney, Agent, or Firm* — Morgan, Lewis & Bockius LLP

(57) ABSTRACT

This application is directed to detecting touch events using a display pixel array. The display pixel array includes display pixels each of which is disposed between a display electrode and a common electrode. For touch sensing, a processing device drives the subset of common electrodes with an integration voltage that varies by a voltage variation at a predetermined slew rate. The processing device also drives a subset of display electrodes corresponding to the subset of common electrodes in a synchronous manner, thereby reducing an impact of parasitic capacitance associated with the subset of common electrodes. Each of the subset of display electrodes is driven with an adjusted display voltage that varies by the voltage variation at the predetermined slew rate. While driving the subsets of common and display electrodes, a capacitive sense signal associated with the subset of common electrodes is measured at an output of a capacitance sense circuit.

20 Claims, 10 Drawing Sheets

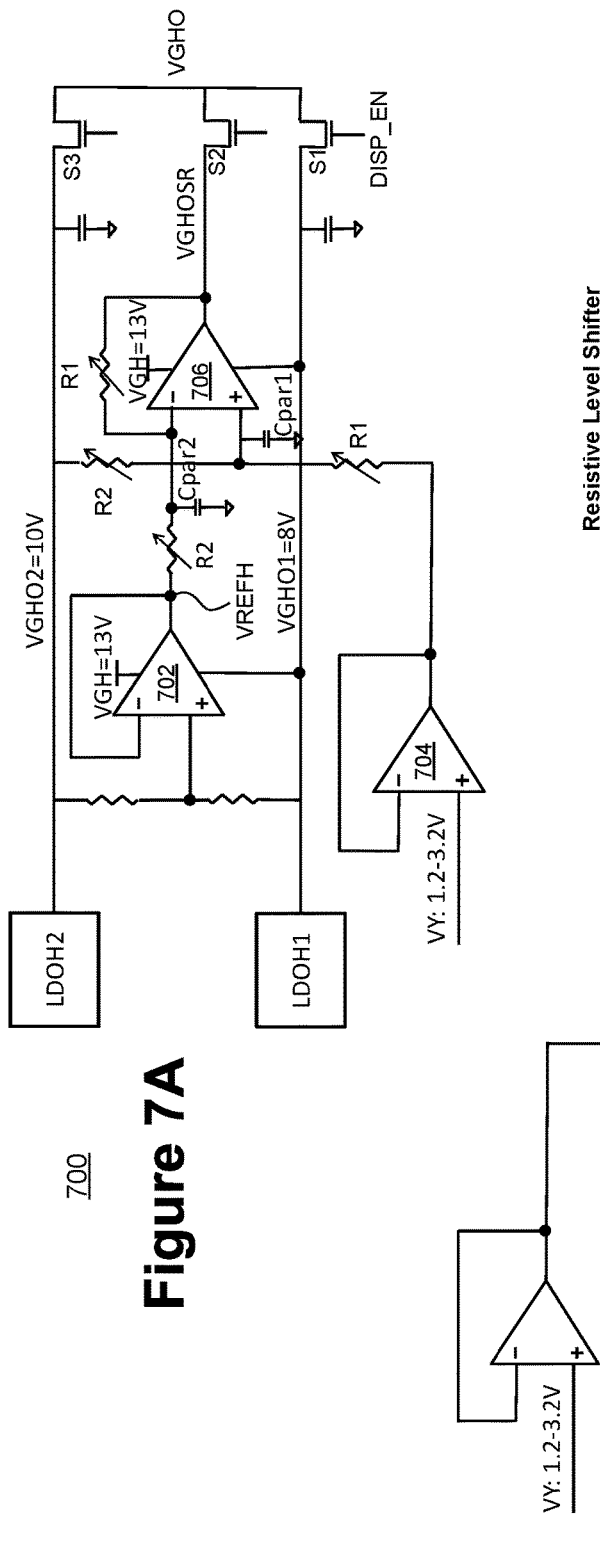
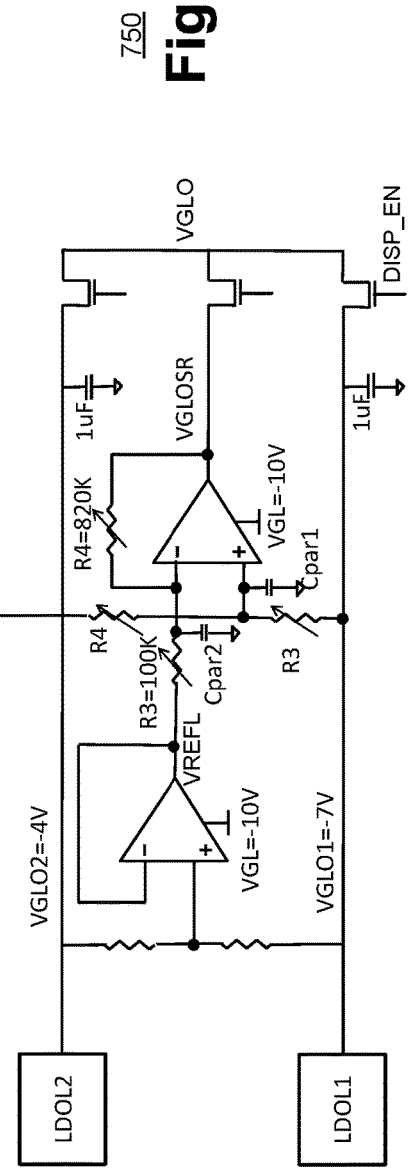
Resistive Level Shifter
Figure 7A
Figure 7B

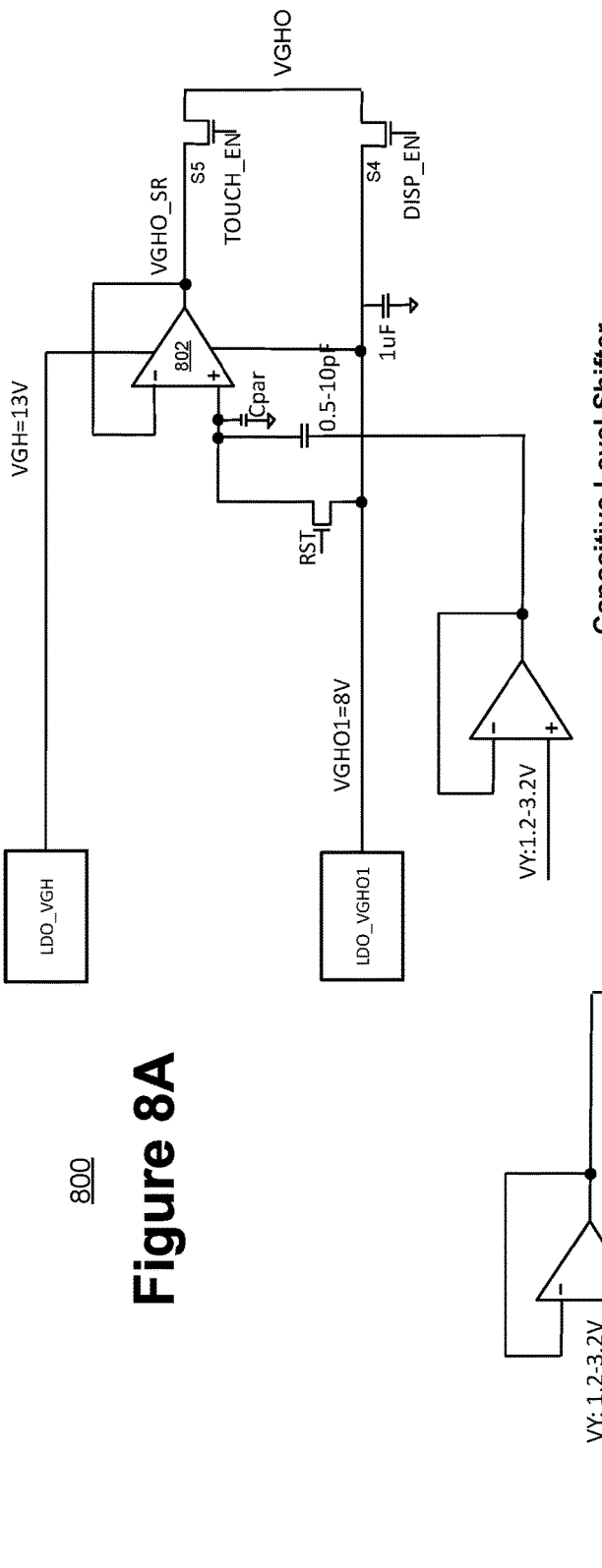
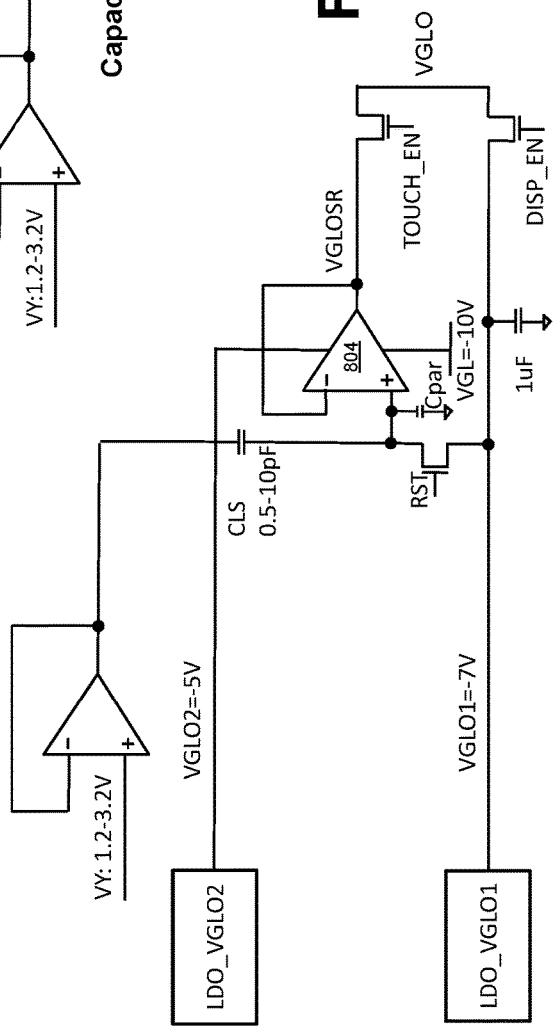
Figure 8A 800
Figure 8B 850
Capacitive Level Shifter

TOUCH DETECTION USING COMMON ELECTRODES OF DISPLAY DEVICE

TECHNICAL FIELD

The disclosed implementations relate generally to touch detection in a display device, including but not limited to methods and systems for configuring common electrodes of the display device for both driving display pixels and sensing touch events, thereby avoiding introduction of a separate touch sensing array in the display device.

BACKGROUND

Touch screens that utilize capacitive sense arrays are widely applied in today's industrial and consumer product markets. Capacitive sense arrays can be found in cellular phones, GPS devices, set-top boxes, cameras, computer screens, MP3 players, digital tablets, and the like, replacing mechanical buttons, knobs, and other conventional user interface controls. A capacitive sense array is often disposed below a touch sensing surface of a touch screen, and includes an array of capacitive sense elements. Capacitances of these capacitive sense elements vary when an object (e.g., a finger, a hand, a stylus, or another object) comes into contact with or hovers above the touch sensing surface. A processing device coupled to the capacitive sense array then measures the capacitances of the capacitive sense elements and/or identifies capacitance variations of the capacitive sense elements for determining a touch or presence of the object associated with the touch sensing surface. The use of the capacitive sense array has offered a convenient and reliable user interface solution that is feasible under many harsh conditions.

Although capacitive sense arrays made of capacitive sense elements have been widely used in many industrial and consumer products, they oftentimes involve one or more dedicated touch sensing layers that are separate from other layers of materials used for display functions of a touch screen. It would be beneficial to integrate touch detection into existing display related infrastructure of a conventional touch screen without causing any detrimental impact on the display functions of the touch screen.

SUMMARY

Touch detection is integrated with a display screen that includes a display pixel array. The display screen normally includes a common electrode layer for providing a bias voltage or a reference voltage to each display pixel in the display pixel array. Accordingly, in various implementations of the application, the common electrode layer of the display screen is configured to use capacitive sense elements for detecting touch events on the display pixel array during a first set of time durations allocated for touch detection, while providing the bias or reference voltages to the display pixels of the display pixel array during a second set of time durations allocated for displaying. Specifically, during the first set of time durations allocated for touch detection, a set of common electrodes is driven with an integration voltage that varies by a predetermined voltage variation at a predetermined slew rate. One or more electrical nodes capacitively coupled to the set of common electrodes are also driven at the same slew rate and have the same voltage variation as the set of driven common electrodes, thereby reducing the impact of parasitic capacitance between the one or more electrical nodes and the set of common electrodes on touch detection implemented via the set of common electrodes. Further, in some implementations, the predetermined slew rate is predetermined to be less than a predetermined slew rate threshold such that the capacitive sense signal does not overshoot to cause current saturation in corresponding capacitance sense circuit.

In accordance with one aspect of the application, a method of detecting touch events using a display pixel array is implemented at a processing device coupled to the display pixel array. The display pixel array includes a plurality of display pixels, a plurality of display electrodes and a plurality of common electrodes, and each display pixel is disposed between a display electrode and a common electrode. The method includes at a touch sensing state, electrically coupling a first subset of the plurality of common electrodes to a capacitance sense circuit for touch detection, and driving the first subset of common electrodes with an integration voltage that varies by a first voltage variation at a predetermined slew rate. The method further includes driving a first subset of display electrodes corresponding to the first subset of common electrodes in a synchronous manner with the first subset of common electrodes, thereby reducing an impact of parasitic capacitance associated with the first subset of common electrodes. Each of the first subset of display electrodes is driven with an adjusted display voltage that varies by the first voltage variation at the predetermined slew rate. The method further includes while driving the first subset of common electrodes and the first subset of display electrodes, measuring a capacitive sense signal associated with the first subset of common electrodes at an output of the capacitance sense circuit.

In yet another aspect of the application, a touch sensing system includes a display pixel array and a processing device. The display pixel array includes a plurality of display pixels, a plurality of display electrodes and a plurality of common electrodes, and each display pixel is disposed between a display electrode and a common electrode. The processing device is coupled to the display pixel array and further includes a processing core, a memory coupled to the processing core, and a capacitive sense circuit coupled to the processing core. The memory stores one or more programs configured for execution by the processing core to control a touch sensing state and a display driving state of the touch sensing system. The capacitive sense circuit is configured to implement the method described herein for detecting touch events.

Thus, devices, storage media, and systems are provided with methods for detecting touches using a display pixel array, thereby reducing an impact of parasitic capacitance associated with the display pixel array and increasing the effectiveness, efficiency, and user satisfaction with such systems. Such methods may complement or replace conventional methods for detecting touches on touch-sensitive surfaces using dedicated touch sensing layers. More importantly, the methods, systems and devices described herein integrate touch detection into existing display related infrastructure in a conventional touch screen without causing any detrimental impact on the display functions of the touch screen.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 7A and 7B are gate voltage generators and that are constructed based on resistive level shifters and configured to make a TFT turn-on voltage $V_{GH}$ and a TFT turn-off voltage $V_{GL}$ track a change of an integration voltage $V_Y$ in a touch sensing state in accordance with some implementations, respectively.

FIGS. 8A and 8B are gate voltage generators and that are constructed based on capacitive level shifters and configured to make a TFT turn-on voltage $V_{GH}$ and a TFT turn-off voltage $V_{GL}$ track a change of an integration voltage $V_Y$ in a touch sensing state in accordance with some implementations, respectively.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

In accordance with various embodiments of this application, touch detection is not implemented using one or more dedicated touch sensing layers. Rather, touch detection is integrated into existing display related infrastructure (e.g., common electrodes of display pixels and related processing circuit) in a conventional touch screen without causing any detrimental impact on display functions of a touch screen. The touch screen normally includes a display pixel array that further includes a common electrode layer for providing a bias voltage or a reference voltage to each display pixel in the display pixel array. In a touch sensing state, the common electrode layer of the touch screen is reconfigured to capacitive sense elements for detecting touch events on the display pixel array during a first set of time durations allocated for touch detection, while in a display driving state, the same common electrode layer provides the bias or reference voltages to the display pixels of the display pixel array during a second set of time durations allocated for displaying. Specifically, during the first set of time durations allocated for touch detection, a set of common electrodes is driven with an integration voltage, and one or more electrical nodes are driven in a synchronous manner with the set of common electrodes. Both the set of common electrodes and the one or more electrical nodes are driven at the same slew rate and have the same voltage variation, thereby reducing the impact of parasitic capacitance between the one or more electrical nodes and the set of common electrodes on touch detection implemented via the common electrodes. As such, touch detection based on the common electrodes used for display driving does not cause any detrimental impact on display functions of the touch screen, and complements/replaces conventional touch detection methods that have to use additional and dedicated touch sensing layers.

Figure 1:
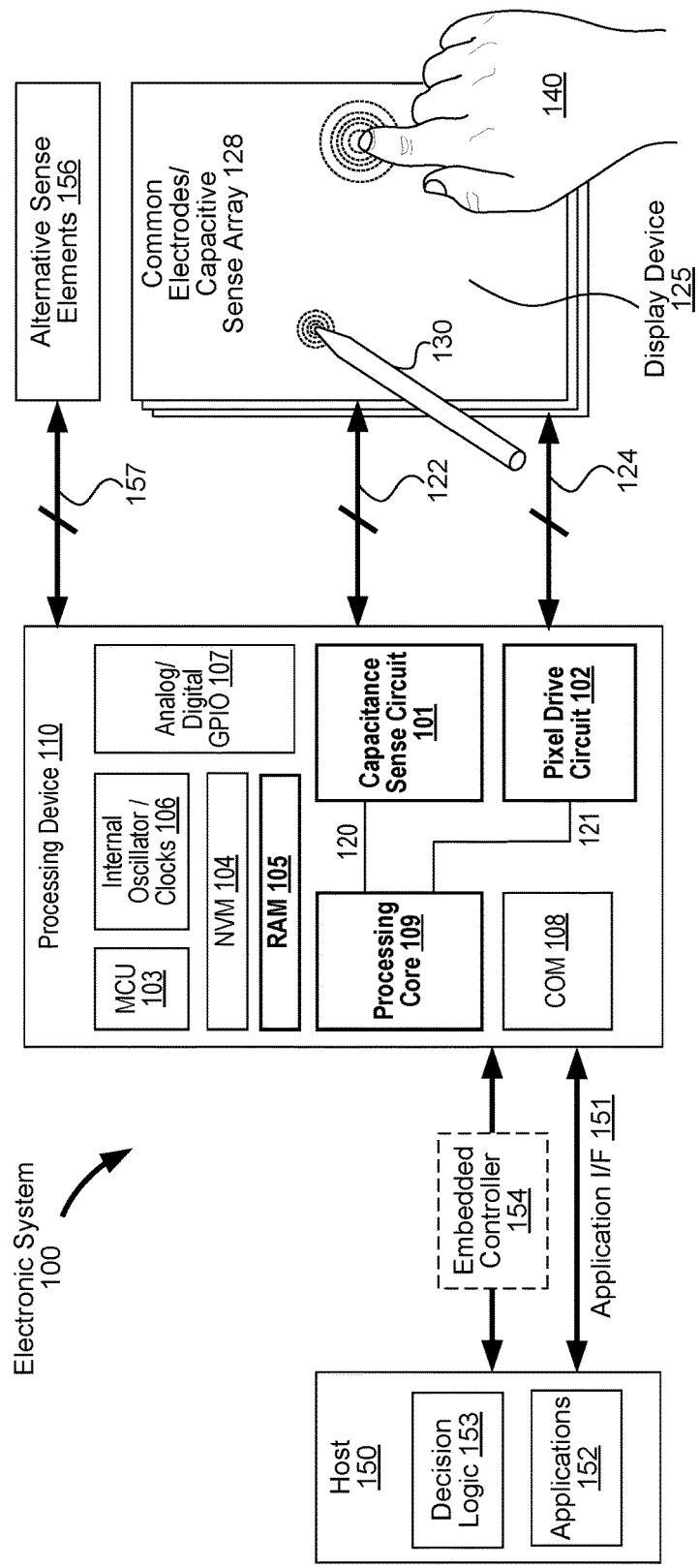
FIG. 1 is a block diagram illustrating an electronic system having a processing device that display driving signals and processes capacitive sense signals in accordance with some implementations.

FIG. 1 is a block diagram illustrating an electronic system 100 having a processing device 110 that display driving signals and processes capacitive sense signals in accordance with some implementations. The processing device 110 is electrically coupled to a display device 125 including a display pixel array. The display pixel array 125 further includes a plurality of display pixels, a plurality of display electrodes and a plurality of common electrodes 128. Each display pixel is disposed between a display electrode and a common electrode 128. More details of the display device 125 are explained below with reference to FIGS. 2A-2B and 3A-3B. The processing device 110 operates in two states including a display driving state and a touch sensing state. In the display driving state, a voltage bias is generated and applied between the display and common electrodes of each display pixel to enable display of a color on the respective display pixel. In the touch sensing state, the plurality of common electrodes 128 are reconfigured to operate as a capacitive sense array 128, and the processing device 110 is configured to measure capacitance variations at the plurality of common electrodes 128 and detect one or more touches proximate to a surface of the display device 125. In some implementations, the processing device 125 alternates between the display driving state and the touch sensing state according to a predetermined duty cycle (e.g., 80%) for the display driving state, and detects a contact with or a proximity to a touch sensing surface associated with the display pixel array without interfering with current display operations of the display pixel array 125.

The processing device 110 can detect conductive objects, such as touch objects 140 (e.g., a finger), a passive or active stylus 130, or any combination thereof when operating in the touch sensing state. The capacitance sense circuit 101 can measure touch data created by a touch using the capacitive sense array 128 reconfigured from the plurality of common electrodes 128. The touch may be detected by a single or multiple sensing cells, each cell representing an isolated sense element or an intersection of sense elements (e.g., electrodes) of the reconfigured capacitive sense array 128. In some implementations, when the capacitance sense circuit 101 measures mutual capacitance of the reconfigured capacitive sense array 128, the processing device 110 acquires a two dimensional capacitive image of the touch sensing object and processes the capacitive image data for peaks and positional information. In some implementations, the processing device 110 is coupled to a microcontroller (e.g., an external host device 150) that obtains a capacitance touch signal data set from the reconfigured capacitive sense array 128. In some implementations, finger detection firmware executing on the microcontroller identifies data set areas that indicate touches, detects and processes peaks, calculates the coordinates, or any combination thereof. The microcontroller can report the precise coordinates and other information to an application processor.

In some implementations, the electronic system 100 includes one or more of a processing device 110, a display device 125 (i.e., a display pixel array), a stylus 130, and a host 150. The common electrodes 128 may include electrodes made of conductive material, such as copper, and are reconfigured to capacitive sense array 128 including capacitive sense elements that are electrodes made of the same conductive material. The common electrodes and sense elements may also be part of an indium-tin-oxide (ITO) panel. In the display driving state, the common electrodes 128 provide a bias voltage or a reference voltage to each display pixel of the display pixel array 125, thereby enabling display of a color on the respective display pixel. In the depicted embodiment, the electronic system 100 includes the common electrodes 128 coupled to the processing device 110 via a bus 124, and the common electrodes 128 are configured to receive display driving signals from the processing device 110 via the bus 124. More specifically, the display driving signals are generated by a pixel drive circuit 102 of the processing device 110. Alternatively, in the touch sensing state, the capacitive sense elements of the reconfigured capacitive sense array 128 can be used to allow the capacitance sense circuit 101 to measure self-capacitance, mutual capacitance, or any combination thereof. In the depicted embodiment, the electronic system 100 includes the reconfigured capacitive sense array 128 coupled to the processing device 110 via a bus 122, and the reconfigured capacitive sense array 128 is configured to provide capacitive sense signals to a capacitance sense circuit 101 of the processing device 110 via the bus 122. The reconfigured capacitive sense array 128 may include a multi-dimension capacitive sense array. In some implementations, the multi-dimension sense array includes multiple sense elements, organized as rows and columns. In some implementations, the reconfigured capacitive sense array 128 has a flat surface profile. In some implementations, the capacitive sense array 128 may have a non-flat surface profile. In some implementations, other configurations of capacitive sense arrays can be used. For example, instead of vertical columns and horizontal rows, the capacitive sense array 128 may have a hexagonal arrangement, or the like, as would be appreciated by one of ordinary skill in the art having the benefit of this disclosure. More details on a capacitive sense array 128 are explained below with reference to FIGS. 2A-2B and 3A-3B.

In some implementations, the electronic system 100 further includes one or more force electrodes (not shown in FIG. 1) that are disposed below the reconfigured capacitive sense array 128 and separated from the reconfigured capacitive sense array 128. The one or more force electrodes are electrically coupled to the processing device 110, and are configured to provide force signals to the processing device 110 for determining force associated with candidate touches detected from the reconfigured capacitive sense array 128. In some implementations, the force signals are measured from capacitance variation associated with the one or more force electrodes, and used to improve accuracy of touch detection based on the capacitive sensing signals.

The operations and configurations of the processing device 110 and the reconfigured capacitive sense array 128 for detecting and tracking a touch object 140 or a stylus 130 are described herein. In short, the processing device 110 is configurable to detect a presence of a touch object 140, a presence of a stylus 130 on the reconfigured capacitive sense array 128, or any combination thereof. If the touching object is an active stylus, the active stylus 130 is configured to operate as the timing "master," and the processing device 110 adjusts the timing of the reconfigured capacitive sense array 128 to match that of the active stylus 130. In some implementations, the reconfigured capacitive sense array 128 capacitively couples with the active stylus 130, as opposed to conventional inductive stylus applications. It should also be noted that the same assembly (e.g., the processing device 110) used for the reconfigured capacitive sense array 128, which is configured to detect touch objects 140, is also used to detect and track the stylus 130 without an additional PCB layer for inductively tracking the active stylus 130.

In some implementations, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). In some implementations, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 104. RAM 105 may be static RAM ("SRAM"). The non-volatile memory 104 may be a flash memory, which may be used to store firmware (e.g., control algorithms executable by processing core 109 to implement operations described herein). The processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 109. In the case of the memory being external to the processing device 110, the processing device 110 is coupled to the other device in which the memory resides as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the reconfigured capacitive sense array 128 (e.g., determining whether an object is detected on or in proximity to the touch sensing surface), resolve where the object is on the sense array (e.g., determining the location of the object), track the motion of the object, or generate other information related to an object detected at the touch sensor. In some implementations, the processing core 109 includes the capacitance sense circuit 101. In some implementations, the processing core 109 performs some or all the functions of capacitance sense circuit 101. Additionally, in some implementations, the processing core 109 provides display information to the pixel drive circuit 102, such that the pixel drive circuit 102 can be configured to drive individual display pixels in the display device 125 to display images or videos based on the display information. In some implementations, the processing core 109 includes some or all functions of the pixel drive circuit 102, i.e., part or all of the pixel drive circuit 102 is integrated in the processing core 109.

In some implementations, the processing core 109 generates a touch detection enable signal 120 and a display driving enable signal 121 that are synchronized to control the capacitance sensing circuit 101 and the pixel drive circuit 102 to detect touch locations and drive individual display pixels, respectively. The touch detection enable signal 120 is used to enable a touch sensing state. In the touch sensing state, the common electrodes 128 are decoupled from the pixel drive circuit 102 and reconfigured to the capacitive sense array 128 coupled to the capacitance sense circuit 102. Self or mutual capacitance of sense elements of the reconfigured capacitive sense array 128 is scanned by the capacitance sense circuit 102. One or more touch locations are thereby detected if one or more objects touch the touch sensing surface of the electronic system 100. Alternatively, in some implementations, the display driving enable signal 121 is used to enable a display driving state (e.g., decouple the capacitance sense circuit 101 from the reconfigured capacitive sense array 128 and couple the pixel drive circuit 102 to the common electrodes 128). In such a display driving state, the pixel drive circuit 102 enables a bias voltage and a reference voltage corresponding to an intended color on each display pixel of the display pixel array. The display pixel displays the intended color when the bias voltage and the reference voltage are applied on the display and common electrodes of the respective display pixel. It is noted that the touch detection enable signal 120 and the display driving enable signal 121 can be enabled sequentially and share operation time of the common electrodes/capacitive sense array 128.

The processing device 110 may also include an analog block array (not shown) (e.g., field-programmable analog array). The analog block array is also coupled to the system bus. An analog block array may be configured to implement a variety of analog circuits (e.g., ADCs or analog filters) using, in some implementations, configurable UMs. The analog block array may also be coupled to the GPIO 107.

In some implementations, the capacitance sense circuit 101 is integrated into the processing device 110. The capacitance sense circuit 101 includes analog I/O for coupling to an external component, such as a touch-sensor pad (not shown), a reconfigured capacitive sense array 128, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some implementations, the capacitance sense circuit 101 operates using a charge accumulation circuit, a capacitance modulation circuit, or other capacitance sensing methods known by those skilled in the art. In some implementations, other capacitance sensing circuits may be used. The mutual capacitive sense arrays, or touch screens, as described herein, may include a transparent, conductive sense array disposed on, in, or under either a visual display itself (e.g. LCD monitor), or a transparent substrate in front of the display.

A reconfigured capacitive sense array 128 includes a plurality of sense elements. When a touch object, such as a finger 140 or stylus 130, approaches the reconfigured capacitive sense array 128, the object causes a decrease in mutual capacitance between some of the sense elements. In some implementations, the presence of a finger increases the capacitance of the electrodes to the environment (Earth) ground, typically referred to as self-capacitance change. In some implementations, the plurality of sense elements of the reconfigured capacitive sense array 128 are configured to operate as transmit (TX) electrodes and receive (RX) electrodes of a mutual capacitive sense array in a first mode to detect touch objects, and to operate as electrodes of a coupled-charge receiver in a second mode to detect a stylus on the same electrodes of the sense array. Specifically, in the first mode, a mutual capacitance is measured at an intersection of a RX electrode and a TX electrode when a transmit signal provided at the RX electrode is coupled to the TX electrode. Utilizing the change in mutual capacitance, the location of the finger on the reconfigured capacitive sense array 128 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersection of electrodes. In some implementations, in the second mode, the stylus 130 is activated to generate a stylus transmit signal, which is then coupled to a subset of sense elements of the reconfigured capacitive sense array 128 that is located below the stylus 130.

In some implementations, the processing device 110 calibrates the sense elements (intersections of RX and TX electrodes) by determining baselines for the sense elements. In some implementations, interpolation is used to detect finger position at better resolutions than a spatial pitch of the sense elements of the reconfigured capacitive sense array 128, and various types of coordinate interpolation algorithms are optionally used to detect a center location of a touch.

The processing device 110 may include internal oscillator/clocks 106 and a communication block ("COM") 108. In some implementations, the processing device 110 includes a spread-spectrum clock (not shown). The oscillator/clocks 106 provides clock signals to one or more of the components of processing device 110. The communication block 108 may be used to communicate with an external component, such as an application processor 150, via an application interface ("I/F") line 151. In some implementations, the processing device 110 may also be coupled to an embedded controller 154 to communicate with the external components, such as a host 150. In some implementations, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some implementations, the components of the processing device 110 may be one or more separate integrated circuits and/or discrete components. In some implementations, the processing device 110 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the implementations described herein are not limited to having a configuration of a processing device coupled to an application processor, but may include a system that measures the capacitance on the capacitive sense array and sends the raw data to a host computer 150 where it is analyzed by an application. In effect, the processing that is done by the processing device 110 may also be done in the application processor. Specifically, in some implementations, instead of performing the operations of the processing core 109 in the processing device 110, the processing device 110 may send the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other embodiments, the processing device 110 is the host 150.

The capacitance sense circuit 101 may be integrated into the IC of the processing device 110, or in a separate IC. In some implementations, descriptions of capacitance sense circuit 101 may be generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the capacitance sense circuit 101.

It is noted that the components of the electronic system 100 may include all the components described above. In some implementations, the electronic system 100 includes fewer than all of the components described above.

In some implementations, the electronic system 100 is used in a tablet computer. In some implementations, the electronic device is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook implementations. Implementations can be used in other capacitive sensing devices, such as a touch-sensor slider (not shown) or touch-sensor buttons (e.g., capacitance sensing buttons). In some implementations, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing implementations may be used in conjunction with non-capacitive sensing elements, including but not limited to pick buttons, sliders (e.g., display brightness and contrast), scroll-wheels, multi-media control (e.g., volume, track advance), handwriting recognition, and numeric keypad operation.

In some implementations, the electronic system 100 further includes one or more alternative sense elements 156 configured to communicate with the processing device 110 via a bus 157. Each alternative sense element 156 is optionally a capacitance based sensor or a non-capacitance sensor. Example alternative sense elements 156 include, but are not limited to, an ambient light sensor, a capacitive touch button, and a side touch sensor.

Figure 2B:
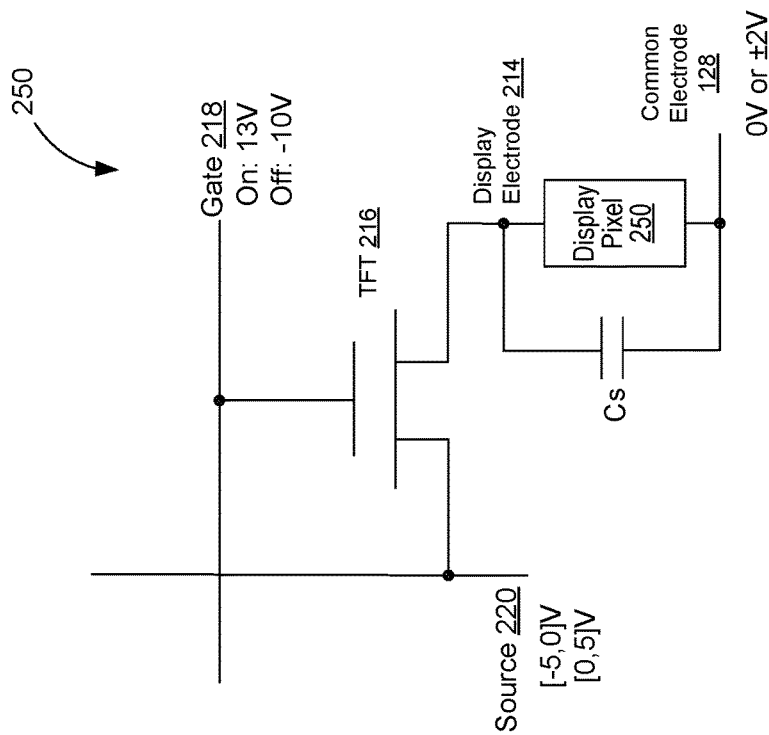
FIG. 2B illustrates an example display pixel driven by a display electrode and a common electrode in a display driving state in accordance with some implementations.
Figure 2A:
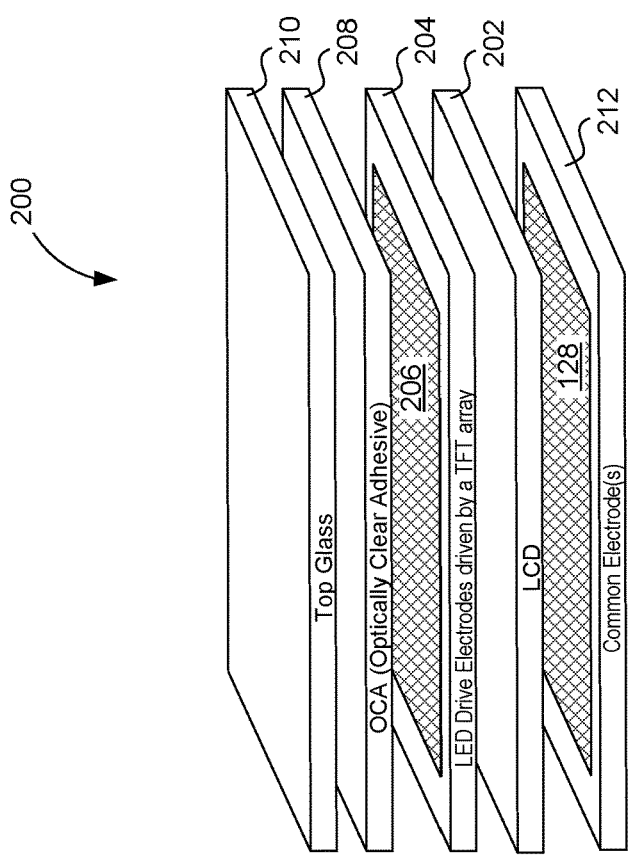
FIG. 2A illustrates an example touch screen assembly (e.g., a liquid crystal display screen) including a common electrode array that is reconfigured to a capacitive sense array in accordance with some implementations.

FIG. 2A illustrates an example touch screen assembly 200 (e.g., a liquid crystal display screen) including a common electrode array that is reconfigured to a capacitive sense array 128 in accordance with some implementations. The touch screen assembly 200 includes a liquid crystal display (LCD) 202 overlaid by the glass 204. A display pattern 206 is constructed on a surface of the glass 204 to form a footprint of a display pixel array. Optionally, as shown in FIG. 2A, the display pattern 206 is constructed on a top surface of the glass 204 that faces away from the LCD 202 or on a bottom surface of the glass 204 that faces the LCD 202. The display pattern 206 includes a plurality of display electrodes for driving a plurality of display pixels made of LCD molecules of the LCD 202. Optically clear adhesive (OCA) 208 is used to bond a top glass 210 to the surface of the glass 204 on which the display pattern 206 is constructed, thus protecting the display pattern 206. The touch screen assembly 200 further includes a common electrode array 128 opposing the plurality of display electrodes formed on display pattern 206. Stated another way, the common electrode array 128 is formed on a glass 212 disposed under the LCD 202 and oppose the glass 204. As such, each display pixel of the LCD 202 is disposed between a respective display electrode and a respective common electrode that are formed on the display pattern 206 and the common electrode layer 128, respectively.

In some implementations not shown in FIG. 2A, the display pattern 206 is constructed on a surface of the glass 204 to form a footprint of a display pixel array 125, and the glass 204 is disposed under the LCD 202. The common electrode array 128 is formed on the glass 212, and the glass 212 is disposed above the LCD 202 and oppose the glass 204. The top glass 210 is bonded to the glass 212 using OCA 208 for protecting the common electrode layer 128. Each display pixel of the LCD 202 is still disposed between a respective display electrode and a respective common electrode that are formed on the display pattern 206 and the common electrode layer 128, respectively.

In some implementations, a first thin film transistor (TFT) array is formed on the glass 204 to drive the display electrodes formed on the display pattern 206. More specifically, a gate layer, a semiconductor layer, a source/drain layer, one or more conductive layers and one or more intervening insulating layers are deposited on the glass 204. These material layers are lithographically patterned on the glass 204 to form functional part (e.g., gate, source and drain) of the TFTs as well as the row and column lines of the first TFT array. For each individual display pixel of the LCD 202, the respective display electrode is electrically coupled to a respective TFT of the first TFT array. The first TFT array is configured to receive display driving signals from the processing device 110 (more specifically, the pixel drive circuit 102 of the processing device 110), and generates a first electrical voltage or current to drive the display electrode of each display pixel. As the first electrical voltage or current is applied to the liquid crystal molecules corresponding to each display pixel, the molecules tend to untwist from its original twisted form, and cause a change in the angle of an incident light. Stated another way, the first TFT array includes a two dimensional (2D) array of TFTs, row lines and column lines. As shown in FIG. 2B, each TFT of the first TFT array is connected between a respective row line and a respective column line, and configured to provide the first electrical voltage or current to drive the corresponding liquid crystal molecules of the corresponding display pixel. In some implementations, the entire common electrode layer 128 is electrically coupled to a reference voltage (sometimes referred to as VCOM). In some implementations, the common electrodes 128 corresponding to the display pixels are driven individually or in group as explained below.

It is noted that in some implementations, a second thin film transistor (TFT) array is formed on the glass 212 to drive the common electrodes 128. More specifically, a gate layer, a semiconductor layer, a source/drain layer, one or more conductive layers and one or more intervening insulating layers are deposited on the glass 212. These material layers are lithographically patterned on the glass 212 to form functional part (e.g., gate, source and drain) of the second TFTs as well as the row and column lines of the second TFT array. For each individual display pixel of the LCD 202, the respective common electrode is electrically coupled to a respective TFT of the second TFT array. The TFT array is configured to receive display driving signals from the processing device 110, and generates a second electrical voltage or current to drive the common electrode corresponding to each display pixel. As the first and second electrical voltages/currents are applied to the liquid crystal molecules corresponding to each display pixel, the molecules tend to untwist from its original twisted form, and cause a change in the angle of an incident light. Stated another way, the second TFT array includes a two dimensional (2D) array of TFTs, row lines and column lines. Each TFT of the second TFT array is connected between a respective row line and a respective column line, and configured to provide the second electrical voltage or current to drive the corresponding liquid crystal molecules of the corresponding display pixel in conjunction with the first electrical voltage or current. In some implementations, the common electrodes 128, the display electrodes, the first TFT array and the second TFT array (if used) are made of transparent material (e.g., indium-tin oxide (ITO)) to allow light to pass through from the side or the back of the touch screen assembly 200.

Figures 3A, 3B:
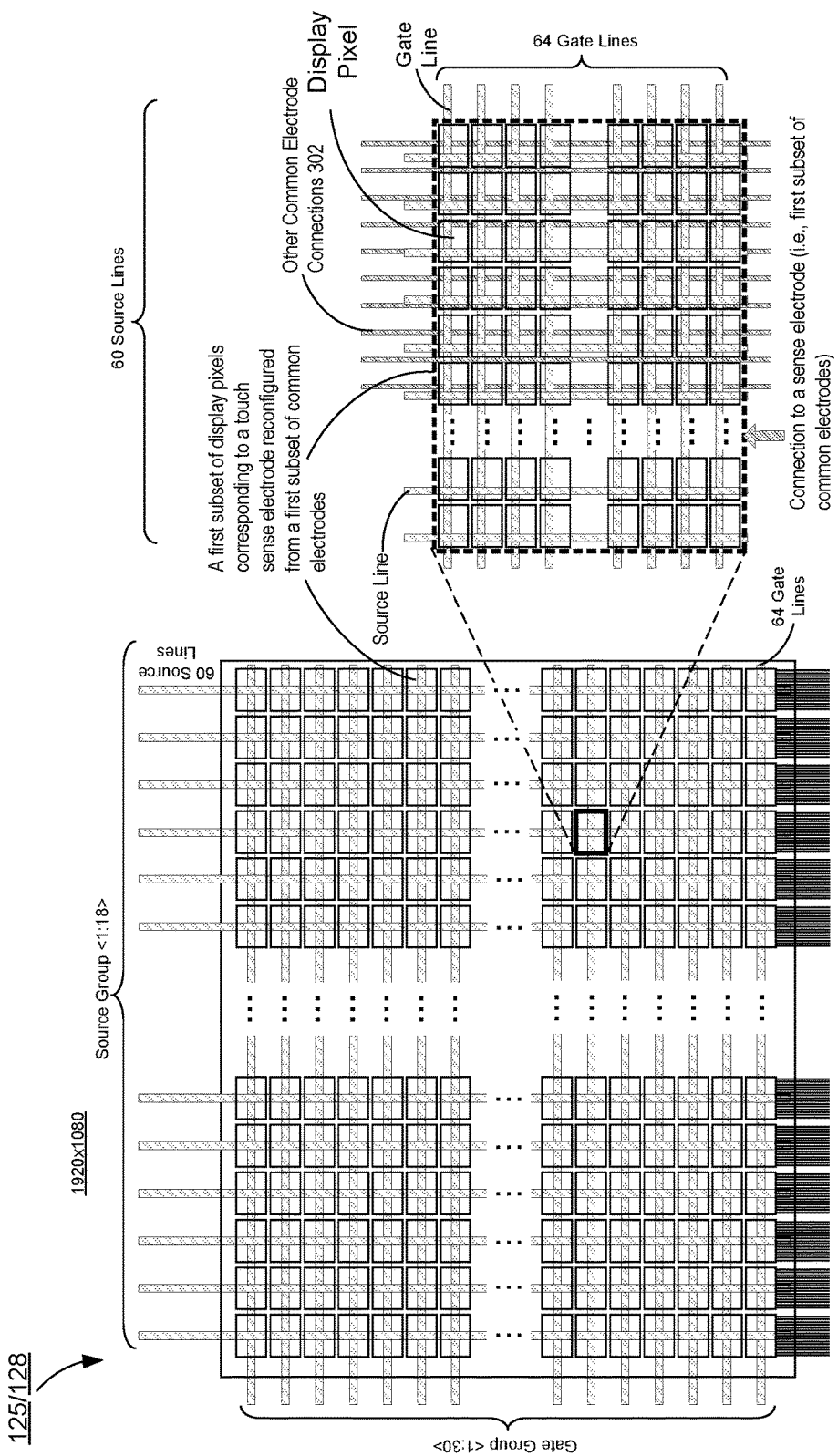
FIG. 3A is an example display pixel array that is reconfigured to operate as a capacitive sense array 128 in accordance with some implementations.
FIG. 3B is an example capacitive sense element that is reconfigured from a set of common electrodes of the display pixel array shown in FIG. 3A in accordance with some implementations.

Optionally, the common electrode array 128 has a diamond pattern, a row-column pattern or a two-dimensional (2D) array of common electrodes (as shown in FIG. 3A). In some implementations related to the row-column pattern, the capacitive sense array 128 reconfigured from the common electrode array 128 includes row and column sense elements that can be expressed as a matrix of the intersections between row and column electrodes. In some implementations, the row and column sense elements are formed on two conductive layers that are electrically insulated from each other, and both of the conductive layers are formed on one of the top or bottom surfaces of the glass 212. In some implementations related to the 2D array of common electrodes, the 2D array of common electrodes includes a plurality of square or rectangular electrodes, and when reconfigured to the capacitive sense array 128, a set of adjacent common electrodes (e.g., a 2D array of 64×60 common electrodes) is grouped into a unit sense element for touch detection. The resolution of the common electrodes 128 is represented as the product of the number of rows and the number of columns associated with the common electrodes 128. The resolution of the reconfigured capacitive sense array 128 is represented as the product of the number of rows and the number of columns associated with the capacitive sense elements. The resolutions of the common electrodes 128 and the reconfigured capacitive sense array 128 could be identical or distinct.

FIG. 2B illustrates an example display pixel 250 driven by a display electrode 214 and a common electrode 218 in a display driving state in accordance with some implementations. As explained above, the display pixel 250 is disposed between the display and common electrodes. A first TFT 216 is connected between a respective row line 218 and a respective column line 220, and configured to provide the first electrical signal to drive the display electrode 214 of the corresponding display pixel 250. In the case of LCD display pixels, the first electrical signal and another second electrical signal are applied onto the display and common electrodes, respectively, and therefore to the liquid crystal molecules corresponding to the display pixel 250. The molecules tend to untwist from their original twisted form, and cause a change in the angle of an incident light, thereby causing display of a color at a location corresponding to the display pixel 250.

The first TFT 216 is formed on the glass 204 to drive the display electrode 214 that is formed on the same glass substrate. More specifically, a gate layer, a semiconductor layer, a source/drain layer, one or more conductive layers and one or more intervening insulating layers are deposited on the glass 204. These material layers are lithographically patterned on the glass 204 to form functional part (e.g., gate, source and drain) of the first TFT 216 as well as the row (gate) line 218 and the column (source) line 220 of the first TFT 216. The first TFT 216 is configured to receive display driving signals from the processing device 110 (more specifically, the pixel drive circuit 102 of the processing device 110), and generates the first electrical signal to drive the display electrode 214 of the display pixel 250.

In some implementations (not shown in FIG. 2B), the display pixel 250 includes a second TFT to generate the second electrical signal to drive the common electrode 128. The second TFT is formed on the glass 218 to drive the common electrode 128 that is formed on the same glass substrate. A gate layer, a semiconductor layer, a source/drain layer, one or more conductive layers and one or more intervening insulating layers are deposited on the glass 212. These material layers are lithographically patterned on the glass 204 to form functional part (e.g., gate, source and drain) of the second TFT as well as a row (gate) line and a column (source) line of the second TFT. The first TFT is configured to receive the display driving signals from the processing device 110 (more specifically, the pixel drive circuit 102 of the processing device 110), and generates the second electrical signal to drive the common electrode 128 of the display pixel 250.

In an example, in the display driving state, the common electrode 128 is coupled to the ground (e.g., 0V) or another reference voltage (e.g., 2V and −2V). The gate line 218 is coupled to a TFT turn-on voltage $V_{GH}$ (e.g., 13V) to turn on the first TFT 216, such that the display electrode 214 is electrically driven by an electrical signal delivered to the source 220 of the first TFT 216. Optionally, the electrical signal of the source 220 has a magnitude of +5V or −5V, and the first electrical signal applied on the display electrode 214 tracks the electrical signal of the source. In another example, the common electrode 128 is coupled to the ground (e.g., 0V). The gate line 218 is coupled to a TFT turn-off voltage $V_{GL}$ (e.g., −10V) to turn off the first TFT 216, such that the display electrode 214 is electrically decoupled from the electrical signal delivered to the source 220 of the TFT 216. Regardless of the magnitude of the electrical signal the source 220 has, the first electrical signal at the display electrode 214 does not track the electrical signal of the source 220.

FIG. 3A is an example display pixel array 125 that is reconfigured to a capacitive sense array 128 in accordance with some implementations, and FIG. 3B is an example capacitive sense element that is reconfigured from a set of common electrodes 128 of the display pixel array 125 shown in FIG. 3A in accordance with some implementations. The display pixel array 125 has a first resolution (e.g., 1920×1080), and the capacitive sense array 128 reconfigured from the display pixel array has a second resolution (e.g., 30×18). The display pixel array 125 includes a plurality of display pixels (e.g., approximately 2M pixels arranged on the LCD 202), a plurality of display electrodes (e.g., approximately 2M display electrodes arranged on the glass 204), and a plurality of common electrodes. Each display pixel 250 is disposed between a display electrode 214 and a common electrode 128. Each display pixel 250 is accessed by a column line (also called a source line 220) and a row line (also called a gate line 218). The column and row lines are configured to control the respective TFT 216 associated with each display pixel 250 to drive the display electrode 214. In an example, the display pixel array 125 has a first number (e.g., approximately 2M) of display pixels arranged to 1920 rows and 1080 columns.

In some implementations, the common electrodes 128 of the display pixel array 125 are reconfigured to operate as the capacitive sense array 128 having a second resolution, such that the capacitive sense array 128 includes a second number (e.g., 540) of capacitive sense elements. In a specific example as shown in FIG. 3B, each sense element includes 64 rows and 60 columns of common electrodes 128, and therefore, the entire capacitive sense array 128 has the second resolution of 30×18. Stated another way, the display pixel array 125 includes an array of 1920×1080 display pixels and is divided into 30×18 pixel sets, and each pixel set includes 64×60 display pixels. The common electrodes 128 corresponding to each pixel set are grouped into one capacitive sense element of the capacitive sense array 128. The pixel set corresponding to each sense element of the capacitive sense array 128 is driven by 64 gate lines and 60 source lines. In some implementations, the pixel set corresponding to each sense element of the capacitive sense array 128 includes a single common electrode, i.e., 64×60 display electrodes share the single common electrode. In some implementations, the pixel set corresponding to each sense element of the capacitive sense array 128 includes a third number (e.g., 64×60 or less) of common electrodes. Optionally, each of the third number of common electrodes corresponds to one or more display pixels in the pixel set. Optionally, the third number of common electrodes are electrically coupled to each other to form the corresponding sense element of the capacitive sense array 128.

Referring to FIG. 3A, in the touch sensing state, the second number of sense elements of the reconfigured capacitive sense array 128 are scanned for detecting a contact with or a proximity to a touch sensing surface associated with the display pixel array 125. Further, referring to FIG. 3B, in each sense element of the reconfigured capacitive sense array 128, the common electrodes 128 are grouped to one or more touch sense signals that are measured by the capacitive sense circuit 101 of the processing device 110 for touch detection in the touch sensing state. However, the common electrodes 128 in each sense element are at least capacitively coupled to the display electrodes 214 via the display pixels 125 corresponding to the respective sense element, and to the gate lines 218 and the source lines 220 via the TFTs 216 corresponding to the respective sense element. In addition, the common electrodes 128 in each sense element are also capacitively coupled to touch sense signals 302 of other sense elements when the touch sense signals 302 are routed via the respective sense element to an edge of the display device 125 to gain access to the processing device 110. As such, when the common electrodes 128 of the display pixel array 125 are reconfigured to operate as the capacitive sense array 128, parasitic capacitance is created for each sense element of the capacitive sense array 128 because of existence of the corresponding display electrode 250, gate lines 218, source lines 220, and signal lines connected to common electrodes of other sense elements.

Figure 4:
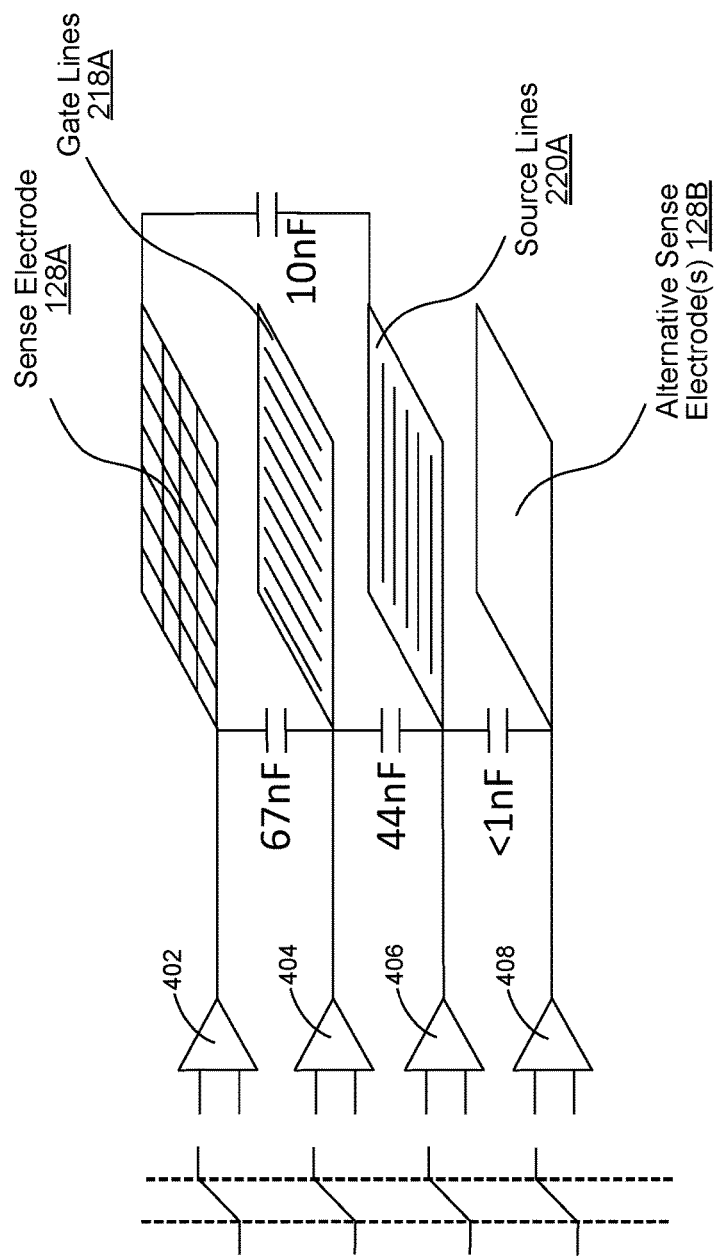
FIG. 4 is an example capacitive sense element that is reconfigured from common electrodes of a display device and impacted by parasitic capacitance in accordance with some implementations.

FIG. 4 is an example capacitive sense element 128A that is reconfigured from a first subset of common electrodes of a display device 125 and impacted by parasitic capacitance in accordance with some implementations. In an example, the sense element 128A has approximate parasitic capacitances of 67 nF and 10 nF with respect to a set of gate lines 218 and a set of source lines 220 corresponding to the common electrodes 128 reconfigured into the sense element 128A, respectively, while the set of gate lines 218A and the set of source lines 220A have parasitic capacitance of 44 nF between each other. The sense element 128A has substantially small capacitance (e.g., less than 1 nF) with respect to one or more alternative sense elements 128B that are distinct from the sense element 128A.

In accordance with some implementations of this application, in a touch sensing state, the sense element 128A is electrically coupled to and driven by an attenuator driver 402 that provides an integration voltage $V_Y$ that varies by a first voltage variation at a predetermined slew rate. The set of gate lines 218A corresponding to the common electrodes 128A reconfigured into the sense element 128A are electrically coupled to and driven by a gate driver 404. The set of source lines 220A corresponding to the common electrodes 128 reconfigured into the sense element 128 are electrically coupled to and driven by a source driver 406. The one or more alternative sense elements 128B that are distinct from and forms parasitic capacitance with the sense element 128A are electrically coupled to and driven by a shield driver 408. In some implementations, the set of gate lines 218 and the set of source lines 220 are driven in a synchronous manner with the sense element 128A (i.e., the first subset of common electrodes corresponding to the sense element 128A), thereby reducing an impact of parasitic capacitance associated with the first subset of common electrodes 218. In some implementations, the one or more alternative sense elements 128B (i.e., a second subset of common electrodes corresponding to the sense element(s) 128B) are driven in a synchronous manner with the sense element 128A.

When the set of gate lines 218A and the set of source lines 220A are driven in the synchronous manner with the first subset of common electrodes, a first subset of display electrodes 214A corresponding to the first subset of common electrodes is effectively driven in a synchronous manner with the first subset of common electrodes corresponding to the sense element 128A. Each of the first subset of display electrodes 214A is therefore driven by an adjusted display voltage $V_{ADP}$ that varies by the first voltage variation at the predetermined slew rate, which is consistent with the integration voltage $V_Y$ driving the sense element 128A.

In addition, in some implementations, the predetermined slew rate is predetermined to be less than a predetermined slew rate threshold such that capacitive sense signal does not overshoot to cause current saturation in corresponding capacitance sense circuit 101. The overshoot is associated with transient charge that not only causes a longer settling time on an integration capacitance of the capacitance sense circuit 101 but also compromises a linear range of the attenuator driver 402, which impacts noise suppression and power consumption for touch detection. In some implementations, the predetermined slew rate of the integration voltage is not greater than 2 V/μsec.

Figure 5A:
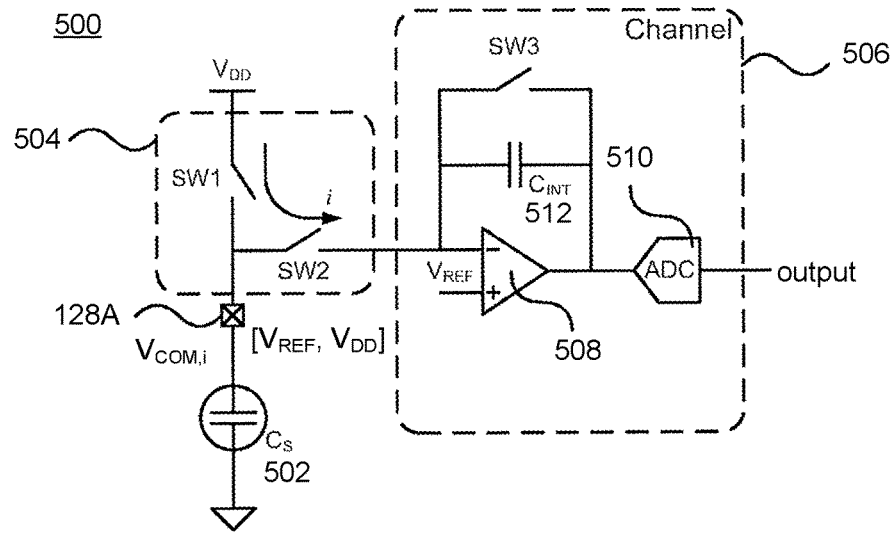
FIG. 5A is a circuit diagram for an example capacitance sense circuit configured to sense self capacitance of a sense element of a capacitive sense array in accordance with some implementations.

FIG. 5A is a circuit diagram 500 for an example capacitance sense circuit 101 configured to sense self capacitance of a sense element 128A of a capacitive sense array 128 in accordance with some implementations. The sense element 128A of capacitive sense array 128 includes a first subset of common electrodes, and forms a self capacitor (Cs) 502 with respect to a ground. The self capacitor 502 is coupled to a switching network 504 and a self capacitance sensing channel 506 both of which are part of the capacitance sense circuit 101. An output of the self capacitance sensing channel 506 is further processed in the processing device 110 to detect a touch event on a touch sensing surface of the display device 125. The self capacitance sensing channel 506 further includes a charge integration amplifier 508 followed by an analog-to-digital converter (ADC) 510. The charge integration amplifier 508 receives a reference voltage $V_{REF}$, and is coupled to an integration capacitor $C_{INT}$ 512 and a switch SW3 to form a charge integrator.

The switching network 504 includes at least two switches SW1 and SW2. The switches SW1, SW2 and SW3 are synchronized to alternate the self capacitance sensing channel 506 and the self capacitor 502 between a reset cycle and a capacitance measurement cycle. At the reset cycle, the self capacitor 502 is electrically coupled to a supply voltage $V_{DD}$ while the integration capacitor 512 is short circuited to remove charge accumulated thereon. At the capacitance measurement cycle, the self capacitor 502 is gradually pulled to the reference voltage $V_{REF}$ while charge on the self capacitor 502 is redistributed to the integration capacitor 512. As such, to measure capacitance of the self capacitor 502, the voltage level driving the sense element 128A varies between the supply voltage $V_{DD}$ and the reference voltage $V_{REF}$, and an output signal measured at the output of the self capacitance sensing channel 506 indicates a capacitance variation of the self capacitor 502 and whether the self capacitor 502 is associated with a touch event.

In some implementations, at a touch sensing state, the supply voltage is 3.2V, and the reference voltage is 1.2V. The voltage level at the sense element 128A varies between 3.2V and 1.2V, and therefore, has a first voltage variation of 2V.

Figure 5B:
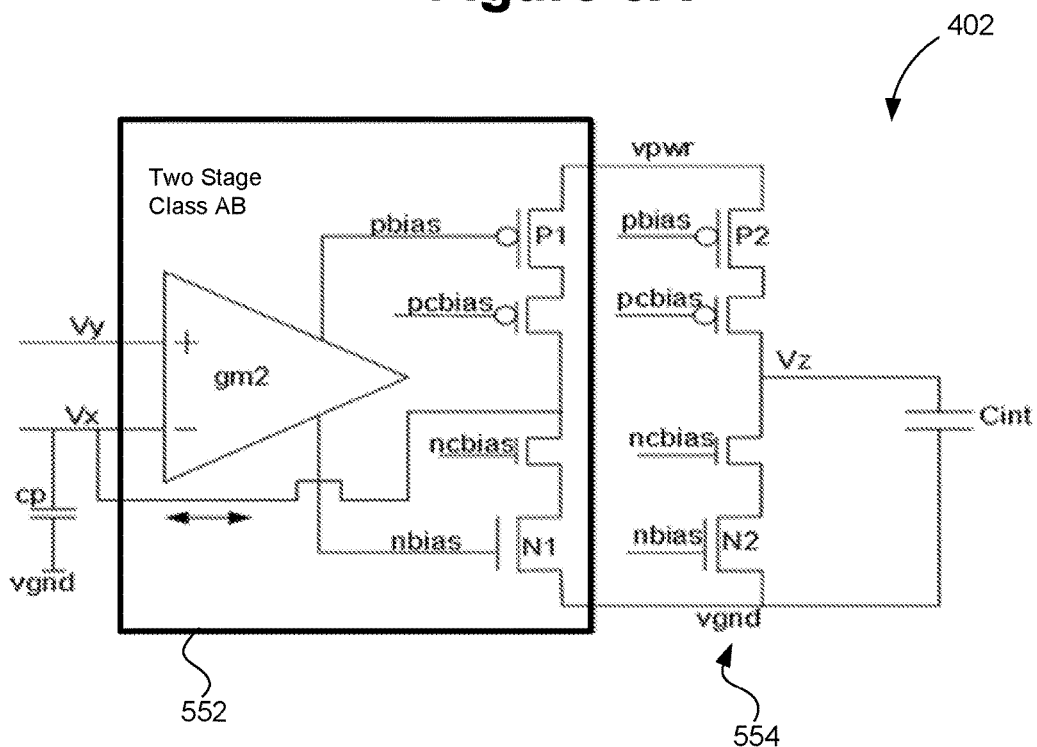
FIG. 5B is a circuit diagram for an example attenuator driver configured to drive a sense element of a capacitive sense array for touch detection in accordance with some implementations.

FIG. 5B is a circuit diagram for an example attenuator driver 402 configured to drive a sense element of a capacitive sense array 128 for touch detection in accordance with some implementations. The attenuator driver 402 includes a two-stage class AB amplifier 552 coupled as a buffer and a cascoded output stage 554, and has an output swing at an output of the cascoded output stage 554. The output swing is limited by headroom requirements of the cascoded output stage 552 of the attenuator driver 402. When transistors P2 and N2 are squeezed, linearity of the attenuator driver 402 is compromised, and a ratio A between a first charge integrated on an integration capacitor Cint and a second charge integrated on an input capacitor Cp is not constant. In some implementations, the ratio A between the first and second charges is defined by sizes of transistors P1, P2, N1 and N2 as follows:

$$A = \frac{S_{P1}}{S_{N1}} \bigg/ \frac{S_{P2}}{S_{N2}}$$

where $S_{P1}$, $S_{N1}$, $S_{P2}$, and $S_{N2}$ are the sizes of transistors P1, P2, N1 and N2, respectively, and in some implementations, a transistor size is represented by a ratio between a width and a length of a corresponding transistor. It is noted that the input voltage $V_Y$ and the output voltage $V_Z$ has a ratio of A as well. In an example, capacitance of the integration capacitor Cint is set to 10 pF, and the input voltage $V_Y$ varies by 1V (e.g., from 2.7V to 1.7V) at a slew rate of 1 V/μsec. The output swing at the output of the attenuator driver 402 reaches 3.3V before the linearity of the attenuator driver 402 is compromised (i.e., the ratio A varies with the output voltage $V_Z$).

Figure 6B:
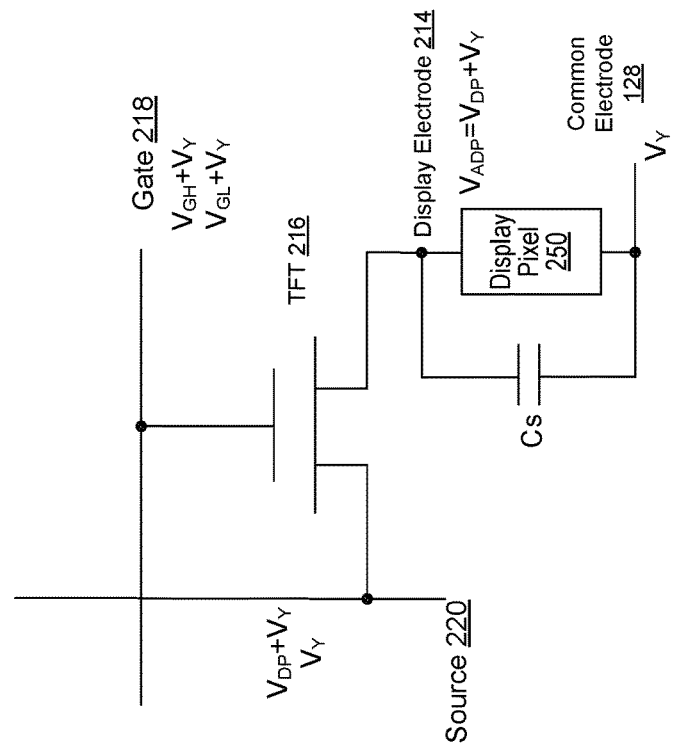
FIG. 6B illustrates an example display pixel driven by a display electrode and a common electrode in a touch sensing state in accordance with some implementations.
Figure 6A:
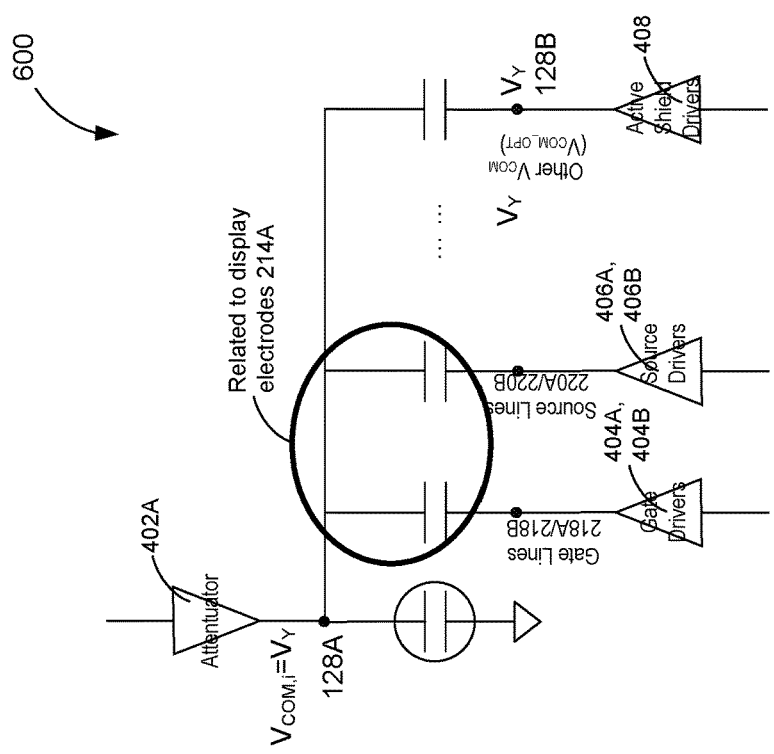
FIG. 6A is an electronic system that compensates for parasitic capacitance associated with a sense element of an example capacitive sense array reconfigured from common electrodes of a display device in accordance with some implementations.

FIG. 6A is an electronic system 600 that compensates for parasitic capacitance associated with a sense element 128A of an example capacitive sense array 128 reconfigured from common electrodes 128 of a display device 125 in accordance with some implementations. At a touch sensing state, the sense element 128A is electrically coupled to and driven by an attenuator driver 402A that provides an integration voltage $V_Y$ that varies by a first voltage variation (e.g., 2V) at a predetermined slew rate (e.g., 2 V/μsec). The sense element 128A is reconfigured from a first subset of common electrodes that corresponds to a first subset of display electrodes 214A, and the first subset of display electrodes 214A is capacitively coupled to the sense element 128A. Each of the first subset of display electrodes 214A is therefore driven by an adjusted display voltage $V_{ADA}$ that varies by the first voltage variation at the predetermined slew rate, which is consistent with the integration voltage driving the sense element 128A. By these means, an impact of parasitic capacitance associated with the first subset of common electrodes can be reduced.

The adjusted display voltage $V_{ADP}$ applied on the first subset of display electrodes 214A is created by a first subset of TFTs 216A that is electrically coupled to the first subset of display electrodes 214. The set of gate lines 218A coupled to the TFTs 216A are electrically coupled to and driven by a gate driver 404A. The set of source lines 220A coupled to the TFTs 216A are electrically coupled to and driven by a source driver 406A. The one or more alternative sense elements 128B that are distinct from and forms parasitic capacitance with the sense element 128A are electrically coupled to and driven by a shield driver 408. In some implementations, the set of gate lines 218 and the set of source lines 220 are driven in a synchronous manner with the sense element 128A (i.e., a first subset of common electrodes corresponding to the sense element 128A). In some implementations, the one or more alternative sense elements 128B (i.e., a second subset of common electrodes corresponding to the sense element(s) 128B) are driven in a synchronous manner with the sense element 128A.

In some implementations, the display device 125 includes one or more subsets of common electrodes 128B reconfigured to the one or more alternative sense elements 128B that are distinct from the sense element 128A. The display electrodes 214B of the alternative sense elements 128B are distinct from the first subset of display electrodes 214A, and are not disposed oppose the sense element 128B. The gate lines 218B and source lines 220B corresponding to the other sense elements 128 may not pass the sense element 128A. The display electrodes 214B, gate lines 218B and source lines 220B corresponding to the alternative sense elements 128B have substantially smaller parasitic impact on the sense element 128A than the display electrodes 214A, gate lines 218A and source lines 220A. Optionally, the electronic system 600 further includes one or more gate drivers 404B and source drivers 406B to drive the gate lines 218B and source lines 220B, respectively. In some implementations, the one or more gate drivers 404B are distinct from the gate driver 404A, and the one or more source drivers 406B are distinct from the source driver 406A. Stated another way, in some implementations, a second subset of display electrodes 214B is driven in a synchronous manner with the first subset of common electrodes 128A. The second subset of display electrodes 214B are distinct from the first subset of display electrodes 214A, and correspond to a distinct subset of display pixels 250B from those corresponding to the first subset of display electrodes 214A and the first subset of common electrodes 128A.

FIG. 6B illustrates an example display pixel 250 driven by a display electrode 214 and a common electrode 218 at a touch sensing state in accordance with some implementations. At the touch sensing state, the common electrode 128 is reconfigured as part of a sense element as shown in FIG. 3B, and electrically coupled to a capacitance sense circuit 101 for touch detection at a location corresponding to the common electrode 128. The common electrode 128 is driven with an integration voltage $V_Y$ that varies by a first voltage variation at a predetermined slew rate. In an example, at a display driving state, the common electrode 128 is driven by a ground voltage, and at the touch sensing state, the common electrode 128 is driven by the integration voltage $V_Y$ that alternates between 3.2V and 1.2V with the first voltage variation of 2V. The display electrode 214 corresponding to the common electrode 128 is also driven in a synchronous manner with the common electrode 128, thereby reducing an impact of parasitic capacitance associated with the common electrode. Stated another way, the display electrode 214 is driven with an adjusted display voltage $V_{ADP}$ that varies by the first voltage variation at the predetermined slew rate. While driving the common electrode and the display electrode, a capacitive sense signal associated with the common electrode 128 is then measured at an output of the capacitance sense circuit 101 (e.g., at an output of a self capacitance sensing channel 506).

In light of the above principle explained with reference to a single display pixel 250 shown in FIG. 6B, a display pixel array 125 includes a plurality of display pixels 250, a plurality of display electrodes 214 and a plurality of common electrodes 128. At a touch sensing state, a first subset of the plurality of common electrodes 128A is electrically coupled to a capacitance sense circuit 101 for touch detection. The first subset of common electrodes 128A is driven with an integration voltage $V_Y$ that varies by a first voltage variation at a predetermined slew rate, and a first subset of display electrodes 214A corresponding to the first subset of common electrodes 128A is driven in a synchronous manner with the first subset of common electrodes, thereby reducing an impact of parasitic capacitance associated with the first subset of common electrodes. Each of the first subset of display electrodes 214A is driven with an adjusted display voltage $V_{ADP}$ that varies by the first voltage variation at the predetermined slew rate. While driving the first subset of common electrodes 128A and the first subset of display electrodes 214A, the processing device 110 measures a capacitive sense signal associated with the first subset of common electrodes 128A at an output of the capacitance sense circuit 101. In addition, in some implementations, a second subset of display electrodes 214B is driven in a synchronous manner with the first subset of common electrodes 128A. The second subset of display electrodes 214B are distinct from the first subset of display electrodes 214A, and correspond to a distinct subset of display pixels 250B from those corresponding to the first subset of display electrodes 214A and the first subset of common electrodes 128A.

It is noted that each display pixel 250A is configured to enable display of a color when a display voltage $V_{DP}$ is applied between the display electrode 214A and the common electrode 128A corresponding to the respective display pixel 250A at a display driving state. While operating at the display driving state, the processing device 110 generates a touch detection enable signal for initiating a touch sensing state on the processing device, and disables the display driving state at a pixel drive circuit 102 that is configured to drive the display electrodes 214A and the common electrodes 128A of the display pixel array 128 at the display driving state. In some implementations, the processing device 110 and the display device 125 alternate between the display driving state and the touch sensing state according to a predetermined duty cycle for the display driving state, such that a contact with or a proximity to a touch sensing surface associated with the display pixel array is detected without interfering with current display operations of the display pixel array 125. As an example, the predetermined duty cycle for the display driving state is 80%.

Referring to FIG. 6B, each of the first subset of display electrodes 214A is driven by a thin film transistor (TFT) that is coupled to a gate electrode (i.e., a gate line 218A) and a source electrode (i.e., a source line 220A). To drive the first subset of display electrodes 214A, for each of the first subset of display electrodes, driving both the gate electrode and the source electrode in a synchronous manner with the first subset of common electrodes 128A. The gate electrode and the source electrode are driven by a gate voltage and a source voltage, respectively, and both the gate and source voltages vary by the first voltage variation at the predetermined slew rate.

In some implementations, the first subset of display electrodes 214A includes a first display electrode that is driven by a first TFT coupled to a first gate electrode and a first source electrode. In accordance with the display driving state, the first gate electrode is driven by a first gate voltage (e.g., $V_{GH}$ or $V_{GL}$). In accordance with the touch sensing state, the first gate electrode is driven in a synchronous manner with the first subset of common electrodes, and the first gate electrode is driven by a second gate voltage that is substantially equal to the first gate voltage superimposed with the integration voltage, and varies by the first voltage variation at the predetermined slew rate. In some implementations, the capacitance sense circuit 101 includes a gate voltage generator configured to generate the second gate voltage. The gate voltage generator is selected from one of a resistive level shifter, a capacitive level shifter, and a ground kicker driver. The gate voltage generator receives the integration voltage $V_Y$, is biased under a TFT turn-on voltage $V_{GH}$ or a TFT turn-off voltage $V_{GL}$, and generates the second gate voltage that varies by the first variation at the predetermined slew rate. More details on the gate voltage generator are explained below with reference to FIGS. 7A-7B, 8A-8B and 9A-9B.

Referring to FIG. 6B, in some implementations, in accordance with the display driving state, the first gate voltage is substantially equal to a TFT turn-on voltage $V_{GH}$ (e.g., 13V) that turns on the first TFT 216 for electrically coupling the first source electrode 220 and the first display electrode 214. At the display driving state, both the first source electrode 220 and the first display electrode 214 are driven by a display voltage $V_{DP}$, and at the touch sensing state that is subsequent to the display driving state, the display voltage $V_{DP}$ is adjusted according to the integration voltage $V_Y$. The adjusted display voltage $V_{ADP}$ is substantially equal to the display voltage $V_{DP}$ superimposed with the integration voltage $V_Y$, and varies by the first voltage variation at the predetermined slew rate. Alternatively, in some implementations, in accordance with the display driving state, the first gate electrode was driven by a TFT turn-off voltage $V_{GL}$ (e.g., −10V) that turns off the first TFT for electrically decoupling the first source electrode and the first display electrode. At the display driving state, the first source electrode is maintained at the same voltage level (e.g., the ground) of the first subset of common electrodes, and at the touch sensing state that is subsequent to the display driving state, the first source electrode is driven with a source voltage that tracks and is substantially equal to the integration voltage $V_Y$ driving the first subset of common electrodes 128A.

Referring to FIG. 3A, in some implementations, a second subset of common electrodes 128B is driven in a synchronous manner with the first subset of common electrodes 128A, and the second subset of common electrodes 128B is distinct from the first subset of common electrodes 128A. Further, in some implementations, the second subset of common electrodes 128B is located in the same row or column of the first subset of common electrodes 128A. The second subset of common electrodes 128B can be driven with a common electrode voltage that tracks and is substantially equal to the integration voltage driving the first subset of common electrodes 128A.

Figures 9A, 9B:
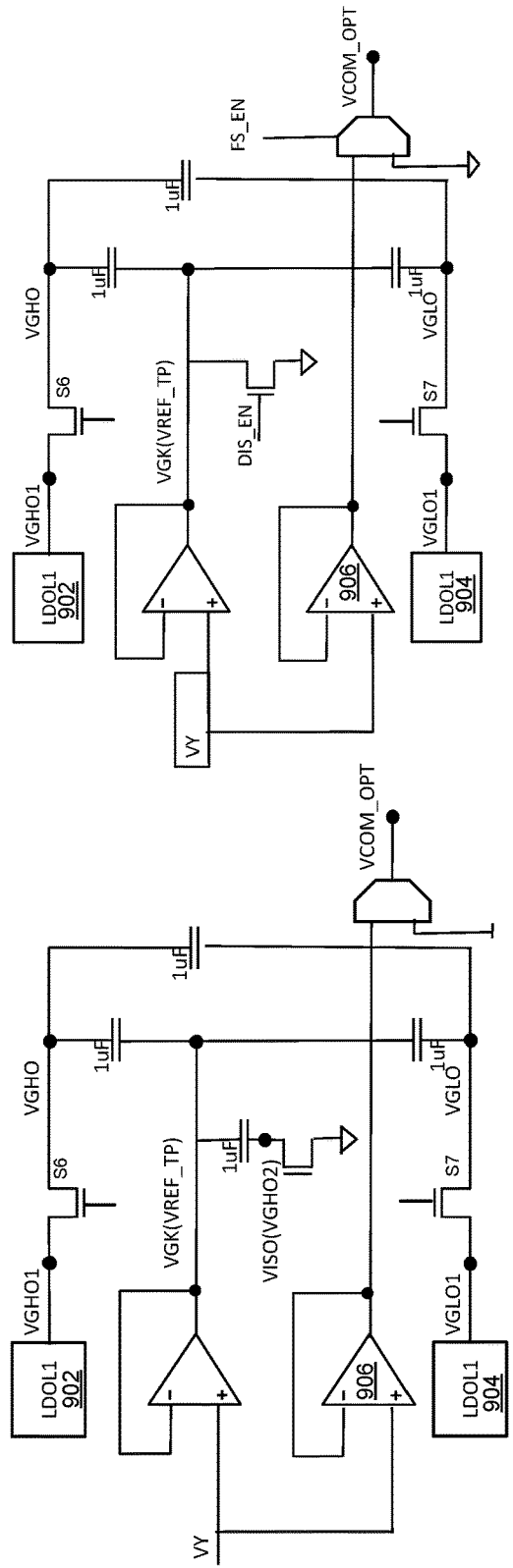
FIGS. 9A and 9B are gate voltage generators and that are constructed based on groundkicker level shifters and configured to make a TFT turn-on voltage $V_{GH}$ and a TFT turn-off voltage $V_{GL}$ track a change of an integration voltage $V_Y$ in a touch sensing state in accordance with some implementations, respectively.

FIGS. 7A and 7B are block diagrams of gate voltage generators 700 and 750 that are constructed based on resistive level shifters and configured to make a TFT turn-on voltage $V_{GH}$ and a TFT turn-off voltage $V_{GL}$ track a change of an integration voltage $V_Y$ in a touch sensing state in accordance with some implementations, respectively. FIGS. 8A and 8B are block diagrams of gate voltage generators 800 and 850 that are constructed based on capacitive level shifters and configured to make a TFT turn-on voltage $V_{GH}$ and a TFT turn-off voltage $V_{GL}$ track a change of an integration voltage $V_Y$ in a touch sensing state in accordance with some implementations, respectively. FIGS. 9A and 9B are block diagrams of gate voltage generators 900 and 950 that are constructed based on groundkicker level shifters and configured to make a TFT turn-on voltage $V_{GH}$ and a TFT turn-off voltage $V_{GL}$ track a change of an integration voltage $V_Y$ in a touch sensing state in accordance with some implementations, respectively. Each of the gate voltage generators 700, 750, 800, 850, 900 and 950 is coupled to receive the integration voltage $V_Y$ and biased under one of a TFT turn-on voltage $V_{GH}$ and a TFT turn-off voltage $V_{GL}$. The integration voltage $V_Y$ varies by a first variation at a predetermined slew rate. Each of the gate voltage generators 700, 750, 800, 850, 900 and 950 generates a respective second gate voltage that varies by the first variation at the predetermined slew rate. In some implementations, the gate voltage generator 700, 800 or 900 generates a second gate voltage that is substantially equal to the TFT turn-on voltage $V_{GH}$ superimposed with the integration voltage $V_Y$, and the gate voltage generator 750, 850 or 950 generates a second gate voltage that is substantially equal to the TFT turn-off voltage $V_{GL}$ superimposed with the integration voltage $V_Y$. In the touch sensing state, each of the second gate voltages generated by the respective gate voltage generator 700, 750, 800, 850, 900 or 950 tracks a change of the integration voltage $V_Y$, i.e., varies by the first variation at the predetermined slew rate.

Referring to FIG. 7A, in some implementations, the integration voltage $V_Y$ has a magnitude in a first range (e.g., 1.2V-3.2V), and is converted to the TFT turn-on voltage $V_{GH}$ having a magnitude in a second range (e.g., 8V-10V). In a display driving state enabled by a display enable signal DISP_EN, the output associated with the TFT turn-on voltage $V_{GH}$ (e.g., VGHO) is electrically coupled to a low-end high supply voltage VGHO1 that has a voltage level of 8V via a first switch S1. In a touch sensing state enabled by a touch enable signal TOUCH_EN, the output associated with the TFT turn-on voltage $V_{GH}$ (e.g., VGHO) is decoupled from the low-end high supply signal VGHO1. While the integration voltage $V_Y$ varies in the first range of 1.2V-3.2V, the output VGHO is electrically coupled to an intermediate signal VGHOSR via a second switch S2, and therefore, configured to track a variation of the integration voltage $V_Y$. When the integration voltage $V_Y$ reaches either rail of the first range (e.g., 1.2V or 3.2V), the second switch S2 is turned off to decouple the output VGHO from the intermediate signal VGHOSR, and a third switch S3 is turned on to couple the output VGHO to a high-end high supply voltage VGHO2 that has an example voltage level of 10V. The low-end and high-end high supply voltages are defined according to the integration voltage $V_Y$, and has a difference that is substantially equal to the first voltage variation of the integration voltage $V_Y$.

Both operational amplifiers 702 and 704 are electrically coupled as unity buffers. In some implementations, while the integration voltage $V_Y$ varies in the first range, an output of the amplifier 702 creates a reference voltage VREFH for another amplifier 706. The amplifier 706 generates an attenuated version of the integration voltage $V_Y$ to the input to the amplifier 706 via one or more resistors (e.g., R1), and the attenuated version of the integration voltage $V_Y$ is level shifted with reference to the high-end high supply voltage VGHO2. The amplifier 706 converts the attenuated version of the integration voltage $V_Y$ based on the reference voltage VREFH created by the amplifier 702. As such, the TFT turn-on voltage $V_{GH}$ (i.e., VGHO) is generated to track the variation of the integration voltage $V_Y$. Resistors having resistances of R1 and R2 are used to provide feedback to the amplifier 706 and enable the first voltage variation of the integration voltage $V_Y$ on the outputted TFT turn-on voltage VGHO.

Similarly, referring to FIG. 7B, the gate voltage generator 750 is configured generate the TFT turn-off voltage $V_{GL}$ to track the first voltage variation of the integration voltage $V_Y$. Specifically, the gate voltage generator 750 is configured to generate a reference voltage VREFL between a low-end low supply voltage VGLO1 and a high-end low supply voltage VGLO2. The integration voltage $V_Y$ is attenuated and level shifted into a desired range with the help of a resistor divider made of resistors R3 and R4. An operational amplifier 708 is then used to process the attenuated and level shifted integration voltage $V_Y$ to generate the TFT turn-off voltage $V_{GL}$ having a desired voltage level and variation (i.e., having the first voltage variation).

Referring to FIG. 8A, in some implementations, the integration voltage $V_Y$ has the magnitude in the first range (e.g., 1.2V-3.2V), and is converted to the TFT turn-on voltage $V_{GH}$ having the magnitude in a second range (e.g., 8V-10V). In a display driving state enabled by a display enable signal DISP_EN, the output associated with the TFT turn-on voltage $V_{GH}$ (e.g., VGHO) is electrically coupled to a low-end high supply voltage VGHO1 that has an example voltage level of 8V via a switch S4. In a touch sensing state enabled by a touch enable signal TOUCH_EN, the output associated with the TFT turn-on voltage $V_{GH}$ (e.g., VGHO) is decoupled from the low-end supply signal VGHO1, and coupled to an output of an operational amplifier 802 via a switch S5. The amplifier 802 is electrically coupled as a unity gain buffer, and configured to couple to the low-end high supply voltage VGHO1 via a switch RST. When the integration voltage $V_Y$ varies in the first range, the input to the amplifier 802 has an example dc voltage level of 8V, and tracks a variation of the integration voltage $V_Y$ until the integration voltage $V_Y$ slews down and the switch RST is asserted.

Similarly, referring to FIG. 8B, when the integration voltage $V_Y$ is substantially low (e.g., at a voltage level of 1.2V) in a touch sensing state, the switch RST is turned on to connect an input of an operation amplifier 804 to the low-end low supply voltage VGLO1. When the integration voltage $V_Y$ increases, the switch RST is turned off allowing charge stored in a level-shifting capacitor CLS to couple a variation of the integration voltage $V_Y$ to the input and output of the amplifier 804. Alternatively, in some implementations, a coupling capacitor is applied to couple the TFT turn-on voltage $V_{GH}$ (e.g., VGHO) and the TFT turn-off voltage $V_{GL}$ (e.g., VGLO). In some circumstances, the coupling capacitor is configured to convert the TFT turn-off voltage VGLO generated by the gate voltage generator 850 to the TFT turn-on voltage VGHO. In some circumstances, the coupling capacitor is configured to convert the TFT turn-on voltage VGHO generated by the gate voltage generator 800 to the TFT turn-off voltage VGLO.

Referring to FIGS. 9A and 9B, when used as power supplies of gate drivers 404, the TFT turn-on voltage VGHO and the TFT turn-off voltage VGLO are controlled to act as a shield during the touch sensing state based on a ground-kicker scheme. In the display driving state, an isolation switch S6 is coupled between the TFT turn-on voltage VGHO and the low-end high supply voltage VGHO1, and an isolation switch S7 is coupled between the TFT turn-off voltage VGLO and the low-end low supply voltage VGLO1. In the display driving state, the isolation switches S6 and S7 are turned on, and voltage regulators (e.g., low drop-out circuits 902 and 904) are configured to provide the TFT turn-on or turn-off voltage to power the gate drivers 404. Under these circumstances, the integration voltage $V_Y$ is static and a switch VISO is turned on to create a decoupling path from the TFT turn-on and turn-off voltages to ground.

In some implementations, in the touch sensing state, the isolation switches S6 and S7 are turned off. The TFT turn-on voltage VGHO, the TFT turn-off voltage VGLO and an intermediate reference voltage VGK are floated. In this situation, when the integration voltage $V_Y$ varies, it is level-shifted upwards onto the TFT turn-on voltage VGHO and downwards onto the TFT turn-off voltage VGLO. As such, the TFT turn-on voltage VGHO and the TFT turn-off voltage VGLO are configured to track the first voltage variation of the integration voltage $V_Y$ without interfering with pixel voltages that enable current display operations of the display pixel array 125. In some implementations, an amplifier 906 is configured to drive an output of the gate voltage generator 900 or 950 (i.e., a pin VCOM_OPT). The pin VCOM_OPT is coupled to drive an optional common mode shield layer to the same voltage as the integration voltage. Optionally, the optional common mode shield layer is configured to provide one or more alternative sense elements 128B.

Further in some implementations, referring to FIG. 9B, the intermediate reference voltage VGK is completely discharged during the display driving state, and needs a duration of time to charge back up to the integration voltage $V_Y$ when a touch sensing mode is enabled. In some implementations, the output of the gate voltage generator 950 (i.e., the pin VCOM_OPT) is controlled by a force sense enable signal FS_EN.

Figure 10:
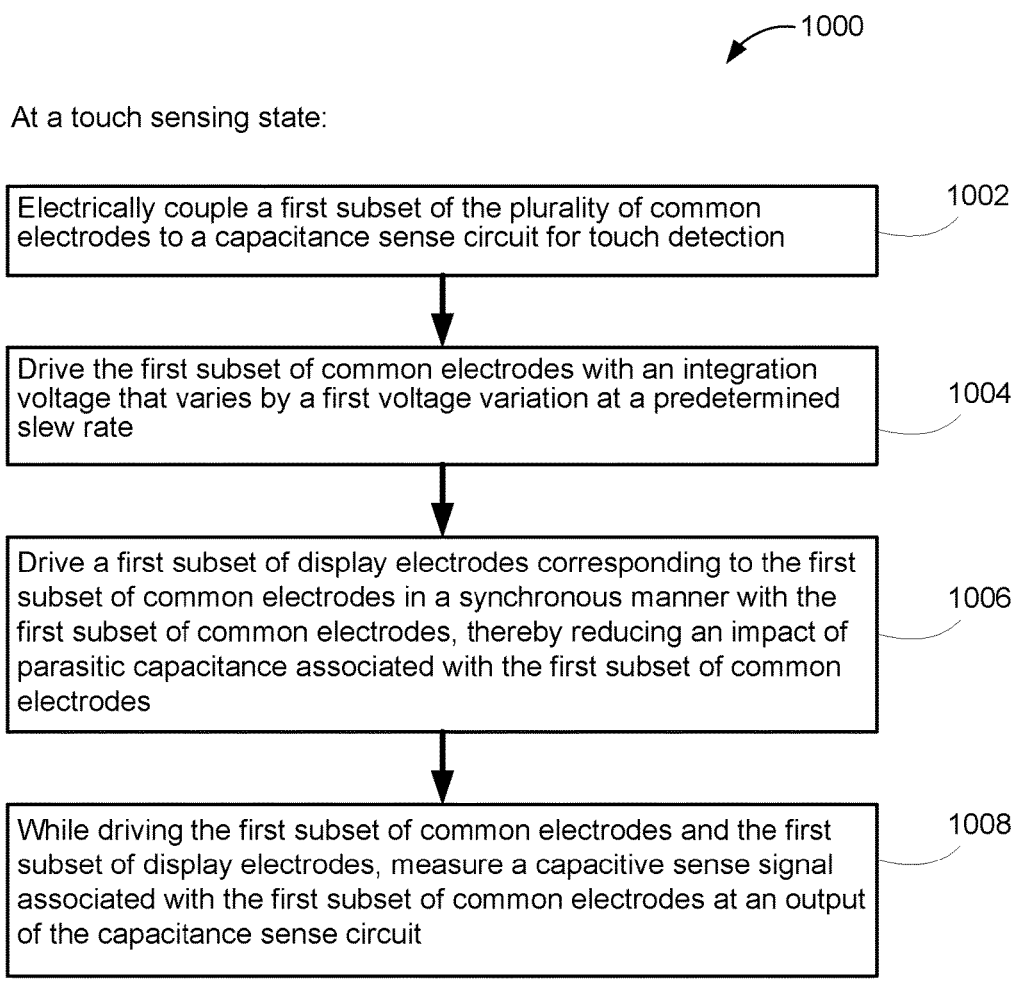
FIG. 10 is a flowchart of a method of detecting touch events using a display pixel array 125 in accordance with some implementations.

FIG. 10 is a flowchart of a method 1000 of detecting touch events using a display pixel array 125 in accordance with some implementations. The method 1000 is implemented at a processing device 110 coupled to the display pixel array 125. The display pixel array 125 includes a plurality of display pixels 250, a plurality of display electrodes 214 and a plurality of common electrodes 128. Each display pixel 250 is disposed between a display electrode 214 and a common electrode 128. The processing device 110 electrically couples (1002) a first subset of the plurality of common electrodes 128 to a capacitance sense circuit 101 for touch detection, and drives (1004) the first subset of common electrodes 128 with an integration voltage $V_Y$ that varies by a first voltage variation at a predetermined slew rate. The processing device 110 also drives (1006) a first subset of display electrodes 214 corresponding to the first subset of common electrodes 128 in a synchronous manner with the first subset of common electrodes, thereby reducing an impact of parasitic capacitance associated with the first subset of common electrodes 128. Each of the first subset of display electrodes 214 is driven with an adjusted display voltage $V_{ADP}$ that varies by the first voltage variation at the predetermined slew rate. While driving the first subset of common electrodes and the first subset of display electrodes 214, the processing device 110 measures (1008) a capacitive sense signal associated with the first subset of common electrodes 128 at an output of the capacitance sense circuit 101.

In some implementations, the processing device 110 drives a second subset of common electrodes in a synchronous manner with the first subset of common electrodes, wherein the second subset of common electrodes is distinct from the first subset of common electrodes. In some implementations, the second subset of common electrodes is located in the same row or column of the first subset of common electrodes. The second subset of common electrodes can be driven with a common electrode voltage that tracks and is substantially equal to the integration voltage driving the first subset of common electrodes. Additionally, in some implementations, while measuring the capacitive sense signal, the processing device 110 drives a second subset of display electrodes in a synchronous manner with the first subset of common electrodes. The second subset of display electrodes are distinct from the first subset of display electrodes, and correspond to a distinct subset of display pixels from those corresponding to the first subset of display electrodes and the first subset of common electrodes.

In some implementations, each of the first subset of display electrodes is driven by a thin film transistor (TFT) that is coupled to a gate electrode and a source electrode. For each of the first subset of display electrodes, both the gate electrode and the source electrode are driven in a synchronous manner with the first subset of common electrodes. The gate electrode and the source electrode are driven by a gate voltage and a source voltage, respectively, and both the gate and source voltages vary by the first voltage variation at the predetermined slew rate.

In some implementations, each display pixel is configured to enable display of a color when a display voltage is applied between the display electrode and the common electrode corresponding to the respective display pixel in a display driving state. In the display driving state, the processing device generates a touch detection enable signal for initiating a touch sensing state on the processing device, and disables the display driving state at a pixel drive circuit 102. The pixel drive circuit 102 is configured to drive the display electrodes and the common electrodes of the display pixel array in the display driving state. Further, in some implementations, the processing device 110 alternates between the display driving state and the touch sensing state according to a predetermined duty cycle for the display driving state, thereby detecting a contact with or a proximity to a touch sensing surface associated with the display pixel array without interfering with current display operations of the display pixel array. An example predetermined duty cycle is 80%.

In some implementations, the display pixel array includes a first number of display pixels corresponding to the first number of display electrodes, and is divided into a second number of pixel sets, one of the second number of pixel sets including a first subset of display pixels corresponding to the first subset of display electrodes and the first subset of common electrodes. Further, the processing device 110 scans each of the second number of pixel sets in the touch sensing state, thereby detecting a contact with or a proximity to a touch sensing surface associated with the display pixel array without interfering with current display operations of the pixel display array. In a specific example, the display pixel array includes an array of 1920×1080 display pixels and is divided into 30×18 pixel sets, and each pixel set includes 64×60 display pixels. The first subset of display electrodes is driven by 64 gate lines and 60 source lines. The first subset of common electrodes includes a third number of common electrodes each of which corresponds to one of the first subset of display electrodes. The first subset of common electrodes includes a single common electrode corresponding to the first subset of display electrodes.

In some implementations, the predetermined slew rate is controlled to be less than a predetermined slew rate threshold such that the capacitive sense signal does not overshoot to cause current saturation in the capacitance sense circuit. For example, the predetermined slew rate of the integration voltage is not greater than 2 V/μsec. Further, in some implementations, in a display driving state, the plurality of common electrodes is electrically coupled to a ground. The first subset of common electrodes is driven between a first reference voltage level (e.g., 1.2V) and a second reference voltage level (e.g., 3.2V) that have a difference equal to the first voltage variation. The first voltage variation of the first subset of common electrodes is greater than 2V.

In some implementations, the first subset of display electrodes includes a first display electrode that is driven by a first TFT coupled to a first gate electrode and a first source electrode. In accordance with a display driving state, the first gate electrode is driven by a first gate voltage, and in accordance with the touch sensing state, the first gate electrode is driven in a synchronous manner with the first subset of common electrodes. The first gate electrode is driven by a second gate voltage that is substantially equal to the first gate voltage superimposed with the integration voltage, and varies by the first voltage variation at the predetermined slew rate. In some implementations, the processing device 110 generates the second gate voltage at a gate voltage generator. The gate voltage generator is selected from one of a resistive level shifter, a capacitive level shifter, and a ground kicker driver. The gate voltage generator is coupled to receive the integration voltage, biased under one of a TFT turn-on voltage and a TFT turn-off voltage, and configured to generate the second gate voltage that varies by the first variation at the predetermined slew rate.

In some situations, in accordance with the display driving state, the first gate voltage is substantially equal to a TFT turn-on voltage that turns on the first TFT for electrically coupling the first source electrode and the first display electrode. In the display driving state, both the first source electrode and the first display electrode are driven by a display voltage. In the touch sensing state that is subsequent to the display driving state, the display voltage is adjusted according to the integration voltage, and the adjusted display voltage is substantially equal to the display voltage superimposed with the integration voltage, and varies by the first voltage variation at the predetermined slew rate.

Alternatively, in some situations, in accordance with the display driving state, the first gate electrode was driven by a TFT turn-off voltage that turns off the first TFT for electrically decoupling the first source electrode and the first display electrode. Further, in some implementations, the first source electrode is maintained at the same voltage level of the first subset of common electrodes, and in the touch sensing state that is subsequent to the display driving state, the first source electrode is driven with a source voltage that tracks and is substantially equal to the integration voltage driving the first subset of common electrodes.

It should be understood that the particular order in which the operations in FIG. 10 have been described is merely exemplary and are not intended to indicate that the described order is the only order in which the operations could be performed. One of ordinary skill in the art would recognize various ways to reorder the operations described herein. It is also noted that more details on the method of detecting touch events using the display pixel array 125 are explained above with reference to FIGS. 1-9. For brevity, these details are not repeated in the description herein.

It will be understood that, although the terms first, second, etc. are, in some instances, used herein to describe various elements, these elements should not be limited by these terms. These terms are only used to distinguish one element from another. For example, a first voltage could be termed a second voltage, and, similarly, a second voltage could be termed a first voltage, without departing from the scope of the various described implementations. The first voltage and the second voltage are both voltage levels, but they are not the same voltage level.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of detecting touch events using a display pixel array, comprising:
   a processing device coupled to the display pixel array including a plurality of display pixels, a plurality of display electrodes and a plurality of common electrodes, wherein each display pixel is disposed between a display electrode and a common electrode, and in a touch sensing state:
   electrically coupling a first subset of the plurality of common electrodes to a capacitance sense circuit for touch detection;
   driving the first subset of common electrodes with an integration voltage that varies by a first voltage variation at a predetermined slew rate;
   driving a first subset of display electrodes corresponding to the first subset of common electrodes in a synchronous manner with the first subset of common electrodes, thereby reducing an impact of parasitic capacitance associated with the first subset of common electrodes, wherein each of the first subset of display electrodes is driven with an adjusted display voltage that varies by the first voltage variation at the predetermined slew rate; and
   while driving the first subset of common electrodes and the first subset of display electrodes, measuring a capacitive sense signal associated with the first subset of common electrodes at an output of the capacitance sense circuit.

2. The method of claim 1, further comprising:
alternating between the display driving state and the touch sensing state according to a predetermined duty cycle for the display driving state, thereby detecting a contact with or a proximity to a touch sensing surface associated with the display pixel array without interfering with current display operations of the display pixel array.

3. The method of claim 1, further comprising:
driving a second subset of common electrodes in a synchronous manner with the first subset of common electrodes, wherein the second subset of common electrodes is distinct from the first subset of common electrodes.

4. The method of claim 3, wherein the second subset of common electrodes is located in the same row or column of the first subset of common electrodes.

5. The method of claim 1, wherein each of the first subset of display electrodes is driven by a thin film transistor (TFT) that is coupled to a gate electrode and a source electrode, and driving the first subset of display electrodes further comprises:
for each of the first subset of display electrodes, driving both the gate electrode and the source electrode in a synchronous manner with the first subset of common electrodes, wherein the gate electrode and the source electrode are driven by a gate voltage and a source voltage, respectively, and both the gate and source voltages vary by the first voltage variation at the predetermined slew rate.

6. The method of claim 1, wherein measuring the capacitive sense signal further comprises:
driving a second subset of display electrodes in a synchronous manner with the first subset of common electrodes, wherein the second subset of display electrodes are distinct from the first subset of display electrodes, and correspond to a distinct subset of display pixels from those corresponding to the first subset of display electrodes and the first subset of common electrodes.

7. The method of claim 1, wherein the display pixel array includes a first number of display pixels corresponding to the first number of display electrodes, and is divided into a second number of pixel sets, one of the second number of pixel sets including a first subset of display pixels corresponding to the first subset of display electrodes and the first subset of common electrodes.

8. The method of claim 7, further comprising:
scanning each of the second number of pixel sets in the touch sensing state, thereby detecting a contact with or a proximity to a touch sensing surface associated with the display pixel array without interfering with current display operations of the pixel display array.

9. The method of claim 7, wherein the first subset of common electrodes includes a third number of common electrodes each of which corresponds to one of the first subset of display electrodes.

10. The method of claim 1, wherein the first subset of common electrodes includes a single common electrode corresponding to the first subset of display electrodes.

11. The method of claim 1, further comprising:
controlling the predetermined slew rate to be less than a predetermined slew rate threshold such that the capacitive sense signal does not overshoot to cause current saturation in the capacitance sense circuit.

12. The method of claim 1, further comprising:
at a display driving state, electrically coupled the plurality of common electrodes to a ground.

13. The method of claim 1, wherein:
the first subset of display electrodes includes a first display electrode that is driven by a first TFT coupled to a first gate electrode and a first source electrode;
in accordance with a display driving state, the first gate electrode is driven by a first gate voltage; and
in accordance with the touch sensing state, driving the first subset of display electrodes further comprises:
driving the first gate electrode in a synchronous manner with the first subset of common electrodes, wherein the first gate electrode is driven by a second gate voltage that is substantially equal to the first gate voltage superimposed with the integration voltage, and varies by the first voltage variation at the predetermined slew rate.

14. The method of claim 13, wherein in accordance with the display driving state, the first gate voltage is substantially equal to a TFT turn-on voltage that turns on the first TFT for electrically coupling the first source electrode and the first display electrode.

15. The method of claim 14, wherein in the display driving state, both the first source electrode and the first display electrode are driven by a display voltage, and wherein in the touch sensing state that is subsequent to the display driving state, the display voltage is adjusted according to the integration voltage, and the adjusted display voltage is substantially equal to the display voltage superimposed with the integration voltage, and varies by the first voltage variation at the predetermined slew rate.

16. The method of claim 13, wherein in accordance with the display driving state, the first gate electrode was driven by a TFT turn-off voltage that turns off the first TFT for electrically decoupling the first source electrode and the first display electrode.

17. The method of claim 14, wherein the first source electrode is maintained at the same voltage level of the first subset of common electrodes, and in the touch sensing state that is subsequent to the display driving state, the first source electrode is driven with a source voltage that tracks and is substantially equal to the integration voltage driving the first subset of common electrodes.

18. The method of claim 13, further comprising:
generating the second gate voltage at a gate voltage generator, wherein the gate voltage generator is selected from one of a resistive level shifter, a capacitive level shifter, and a ground kicker driver, wherein the gate voltage generator is coupled to receive the integration voltage, biased under one of a TFT turn-on voltage and a TFT turn-off voltage, and configured to generate the second gate voltage that varies by the first variation at the predetermined slew rate.

19. A touch sensing system, comprising:
a display pixel array including a plurality of display pixels, a plurality of display electrodes and a plurality of common electrodes, wherein each display pixel is disposed between a display electrode and a common electrode; and
a processing device coupled to the display pixel array, further including:
a processing core;
a memory coupled to the processing core, wherein the memory stores one or more programs configured for execution by the processing core to control a touch sensing state and a display driving state of the touch sensing system; and
a capacitive sense circuit coupled to the processing core, wherein the capacitive sense circuit is configured to:
at the touch sensing state:
electrically couple to a first subset of the plurality of common electrodes for touch detection;
drive the first subset of common electrodes with an integration voltage that varies by a first voltage variation at a predetermined slew rate;
drive a first subset of display electrodes corresponding to the first subset of common electrodes in a synchronous manner with the first subset of common electrodes, thereby reducing an impact of parasitic capacitance associated with the first subset of common electrodes, wherein each of the first subset of display electrodes is driven with an adjusted display voltage that varies by the first voltage variation at the predetermined slew rate; and
while driving the first subset of common electrodes and the first subset of display electrodes, measure a capacitive sense signal associated with the first subset of common electrodes at an output of the capacitance sense circuit.

20. An electronic system, comprising:
a display pixel array including a plurality of display pixels, a plurality of display electrodes and a plurality of common electrodes, wherein each display pixel is disposed between a display electrode and a common electrode; and
a processing device coupled to the display pixel array, further including a capacitive sense circuit coupled to the processing core, wherein the capacitive sense circuit is configured to:
in a touch sensing state:
electrically couple to a first subset of the plurality of common electrodes for touch detection;
drive the first subset of common electrodes with an integration voltage that varies by a first voltage variation at a predetermined slew rate;
drive a first subset of display electrodes corresponding to the first subset of common electrodes in a synchronous manner with the first subset of common electrodes, thereby reducing an impact of parasitic capacitance associated with the first subset of common electrodes, wherein each of the first subset of display electrodes is driven with an adjusted display voltage that varies by the first voltage variation at the predetermined slew rate; and
while driving the first subset of common electrodes and the first subset of display electrodes, measure a capacitive sense signal associated with the first subset of common electrodes at an output of the capacitance sense circuit.

\* \* \* \* \*

UNITED STATES PATENT AND TRADEMARK OFFICE
CERTIFICATE OF CORRECTION

PATENT NO. : 10,338,439 B2
APPLICATION NO. : 15/466760
DATED : July 2, 2019
INVENTOR(S) : Ellis et al.

Page 1 of 1

It is certified that error appears in the above-identified patent and that said Letters Patent is hereby corrected as shown below:

In the Claims

Claim 1, Column 25, Line 59, please delete "a processing device" and insert --at a processing device--.

Signed and Sealed this
Seventeenth Day of September, 2019

Andrei Iancu
*Director of the United States Patent and Trademark Office*